United States Patent
Miyaki et al.

(10) Patent No.: US 11,312,244 B2
(45) Date of Patent: Apr. 26, 2022

(54) OPEN CABIN ELECTRIC WHEELED VEHICLE

(71) Applicant: YAMAHA HATSUDOKI KABUSHIKI KAISHA, Iwata (JP)

(72) Inventors: Mutsuaki Miyaki, Iwata (JP); Dai Sudo, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 185 days.

(21) Appl. No.: 16/751,195

(22) Filed: Jan. 23, 2020

(65) Prior Publication Data
US 2020/0238837 A1 Jul. 30, 2020

(30) Foreign Application Priority Data

Jan. 25, 2019 (JP) .............................. JP2019-011464

(51) Int. Cl.
*B60K 1/00* (2006.01)
*B60L 50/50* (2019.01)
(Continued)

(52) U.S. Cl.
CPC ................ *B60L 50/50* (2019.02); *B60K 1/00* (2013.01); *B60L 50/66* (2019.02); *B60L 50/71* (2019.02);
(Continued)

(58) Field of Classification Search
CPC .......... B60L 50/50; B60L 50/66; B60L 50/71; B60L 2200/00; B60K 1/00;
(Continued)

(56) References Cited

U.S. PATENT DOCUMENTS

| 7,775,311 B1 * | 8/2010 | Hardy ..................... B60L 50/16 180/68.5 |
| 2002/0060100 A1 * | 5/2002 | Nagura ................ B60K 15/063 180/65.1 |

(Continued)

FOREIGN PATENT DOCUMENTS

JP 2010125110 A 6/2010

*Primary Examiner* — Erez Gurari
(74) *Attorney, Agent, or Firm* — Rabin & Berdo, P.C.

(57) ABSTRACT

An open cabin electric wheeled vehicle includes a large-capacity driving battery having a volume energy density higher than the volume energy density of a lead storage battery, the large-capacity driving battery being configured to supply electric power to a driving electric motor. The vehicle also includes a fuel-type electric power generation apparatus that generates electric power using a fuel. As seen from a leftward direction or a rightward direction, between the large-capacity driving battery and the fuel-type electric power generation apparatus, a recess overlaps with a passage region which allows people or baggage to pass through of an entrance and exit opening portion having no door, so that a bottom end of a front wall portion, a bottom end of a rear wall portion, and a bottom portion are located further downward than a top end of the large-capacity driving battery which has a volume energy density higher than the volume energy density of a lead storage battery, and a top end of the fuel-type electric power generation apparatus.

9 Claims, 16 Drawing Sheets

(51) Int. Cl.
*B60L 50/60* (2019.01)
*B60L 50/71* (2019.01)
*H01M 10/0525* (2010.01)
*H01M 10/30* (2006.01)
*H01M 10/34* (2006.01)
*H01M 8/24* (2016.01)

(52) U.S. Cl.
CPC ......... *H01M 8/24* (2013.01); *H01M 10/0525* (2013.01); *H01M 10/30* (2013.01); *H01M 10/345* (2013.01); *B60L 2200/00* (2013.01); *H01M 2220/20* (2013.01); *H01M 2250/20* (2013.01)

(58) Field of Classification Search
CPC ............. H01M 10/0525; H01M 10/30; H01M 10/345; H01M 8/24; H01M 2250/20; H01M 2220/20
See application file for complete search history.

(56) References Cited

U.S. PATENT DOCUMENTS

| | | | |
|---|---|---|---|
| 2003/0111971 A1* | 6/2003 | Ishikawa | B60L 3/04 318/139 |
| 2005/0093287 A1* | 5/2005 | Kondo | B60K 1/04 280/834 |
| 2007/0007054 A1* | 1/2007 | Nakashima | B62D 25/025 180/65.1 |
| 2007/0007060 A1* | 1/2007 | Ono | B62D 25/2036 180/65.31 |
| 2010/0044133 A1* | 2/2010 | Jufuku | H01M 8/00 180/68.5 |
| 2011/0043355 A1* | 2/2011 | Chander | B60K 15/05 340/455 |
| 2012/0064426 A1* | 3/2012 | Sato | H01M 8/04044 429/434 |
| 2013/0206491 A1* | 8/2013 | Kor | B60L 58/27 180/65.225 |
| 2014/0224562 A1* | 8/2014 | Ozawa | B60K 15/03006 180/291 |
| 2018/0086343 A1* | 3/2018 | Crain | B60L 58/20 |
| 2018/0244142 A1* | 8/2018 | Takayanagi | B60K 15/063 |
| 2020/0130519 A1* | 4/2020 | Kobayashi | B60L 58/40 |
| 2020/0238837 A1* | 7/2020 | Miyaki | B60L 50/50 |

* cited by examiner

Fig.14
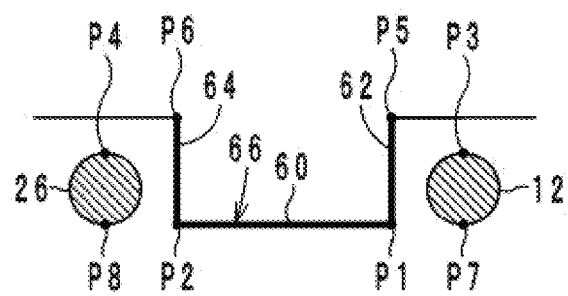
66:60, 62, 64
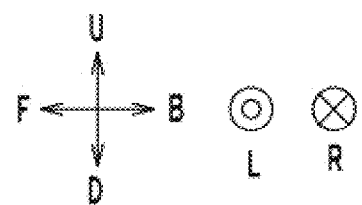

Fig.15
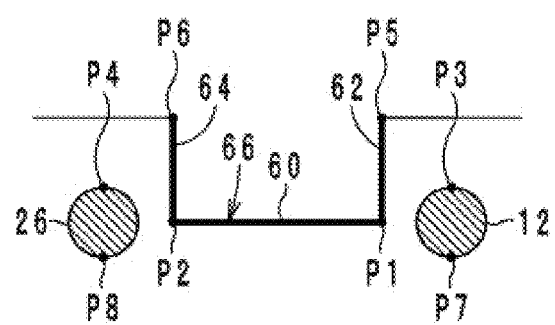
66:60, 62, 64
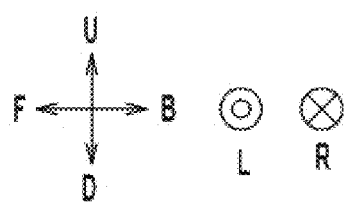

OPEN CABIN ELECTRIC WHEELED VEHICLE

TECHNICAL FIELD

The present teaching relates to an open cabin electric wheeled vehicle equipped with a large-capacity driving battery and a fuel-type electric power generation apparatus.

BACKGROUND ART

For example, an open cabin electric wheeled vehicle disclosed in Patent Literature 1 is known as a conventional invention relating to open cabin electric wheeled vehicles. The open cabin electric wheeled vehicle disclosed in Patent Literature 1 includes a vehicle body forming a cabin which accommodates people. The vehicle body includes entrance and exit openings. The entrance and exit openings are provided in a left side face and a right side face of the vehicle body. No door is provided in the entrance and exit openings. Therefore, the inside of the cabin and the outside of the cabin are connected. This kind of open cabin electric wheeled vehicle is equipped with a battery and an electric motor. The electric motor generates a driving force for causing the open cabin electric wheeled vehicle to travel, by means of electric power stored in the battery. The open cabin electric wheeled vehicle described above has a simple vehicle structure.

CITATION LIST

Patent Literature

Patent Literature 1: Japanese Patent Application Publication No. 2010-125110

SUMMARY OF INVENTION

Technical Problem

There is a demand for the following two kinds of technology to be adopted in an open cabin electric wheeled vehicle that has a simple vehicle structure as described above. In addition, even when the following two kinds of technology are adopted in an open cabin electric wheeled vehicle, there is a demand for the vehicle structure to not become complicated.

First kind of technology: adoption of a large-capacity driving battery.

Second kind of technology: adoption of a fuel-type electric power generation apparatus such as a fuel cell or an engine for electric power generation.

Therefore, an object of the present teaching is to suppress complication of the vehicle structure of an open cabin electric wheeled vehicle equipped with a large-capacity driving battery which has a volume energy density higher than the volume energy density of a lead storage battery and which supplies electric power to a driving electric motor, and a fuel-type electric power generation apparatus that generates electric power using a fuel.

Solution to Problem

The inventors of the present application conducted studies regarding the structure of a large-capacity driving battery and the structure of an electric power generation apparatus with a view to suppressing complication of the vehicle structure of an open cabin electric wheeled vehicle. From the viewpoint of suppressing complication of the vehicle structure of an open cabin electric wheeled vehicle, normally a large-capacity driving battery is disposed near a fuel-type electric power generation apparatus. This is because wiring and the like are shortened by disposing the large-capacity driving battery near the fuel-type electric power generation apparatus.

However, the optimal environment for driving of a large-capacity driving battery and the optimal environment for driving of a fuel-type electric power generation apparatus are different. Therefore, when a large-capacity driving battery is disposed near a fuel-type electric power generation apparatus, measures are taken to inhibit interaction between the large-capacity driving battery and the fuel-type electric power generation apparatus. A measure for inhibiting interaction between a large-capacity driving battery and a fuel-type electric power generation apparatus is, for example, using a board to form a partition between a chamber in which the large-capacity driving battery is housed and a chamber in which the fuel-type electric power generation apparatus is housed. As a result, the vehicle structure of the open cabin electric wheeled vehicle becomes complicated.

Therefore, unlike the usual approach of disposing a large-capacity driving battery and a fuel-type electric power generation apparatus near to each other, the inventors of the present application attempted an approach that involved disposing a large-capacity driving battery and a fuel-type electric power generation apparatus at separate locations from each other. At such time, in order to suppress complication of the vehicle structure of the open cabin electric wheeled vehicle, the inventors of the present application conceived of the idea of utilizing the existing vehicle structure of the open cabin electric wheeled vehicle to dispose the large-capacity driving battery and the fuel-type electric power generation apparatus at separate locations from each other. As a result, the inventors of the present application had the idea that interaction between the large-capacity driving battery and the fuel-type electric power generation apparatus can be suppressed without implementing a new measure for inhibiting interaction between the large-capacity driving battery and the fuel-type electric power generation apparatus.

An open cabin electric wheeled vehicle of (1),
wherein a travelling direction of the open cabin electric wheeled vehicle is defined as "frontward direction",
the open cabin electric wheeled vehicle comprising:
a vehicle body forming a cabin which accommodates people or baggage, the vehicle body including an entrance and exit opening portion and a recess, the entrance and exit opening portion being provided in a left side face or a right side face of the vehicle body and having a passage region which allows the people or the baggage to pass through, the entrance and exit opening portion having no door, the recess having a bottom portion, a front wall portion and a rear wall portion, the bottom portion extending in a left-right direction, the front wall portion extending upward from a front end of the bottom portion, the rear wall portion extending upward from a back end of the bottom portion;
one or more driving wheels supported by the vehicle body; and
a driving electric motor that generates a driving force for rotating the one or more driving wheels,
the open cabin electric wheeled vehicle further comprising:
a large-capacity driving battery having a volume energy density higher than a volume energy density of a lead storage battery, the large-capacity driving battery being configured to supply electric power to the driving electric motor; and a fuel-type electric power generation apparatus that generates electric power using a fuel, wherein:

as seen from a leftward direction or a rightward direction, between the large-capacity driving battery and the fuel-type electric power generation apparatus, the recess overlaps with the passage region which allows the people or the baggage to pass through of the entrance and exit opening portion having no door, so that a bottom end of the front wall portion, a bottom end of the rear wall portion, and the bottom portion are located further downward than a top end of the large-capacity driving battery that has a volume energy density higher than a volume energy density of a lead storage battery and a top end of the fuel-type electric power generation apparatus.

According to the open cabin electric wheeled vehicle of (1), in an open cabin electric wheeled vehicle comprising a large-capacity driving battery having a volume energy density higher than a volume energy density of a lead storage battery, the large-capacity driving battery being configured to supply electric power to a driving electric motor, and a fuel-type electric power generation apparatus that generates electric power using a fuel, complication of the vehicle structure of the open cabin electric wheeled vehicle can be suppressed. More specifically, the open cabin electric wheeled vehicle of (1) comprises a large-capacity driving battery and a fuel-type electric power generation apparatus. In this case, a measure for inhibiting interaction between the large-capacity driving battery and the fuel-type electric power generation apparatus is required in the open cabin electric wheeled vehicle. However, newly providing a measure for inhibiting interaction between the large-capacity driving battery and the fuel-type electric power generation apparatus will lead to complication of the vehicle structure of the open cabin electric wheeled vehicle.

Therefore, in the open cabin electric wheeled vehicle of (1), by utilizing an existing recess, interaction between the large-capacity driving battery and the fuel-type electric power generation apparatus is inhibited while suppressing complication of the vehicle structure of the open cabin electric wheeled vehicle. Specifically, the vehicle body of the open cabin electric wheeled vehicle includes a recess. The recess has a bottom portion, a front wall portion and a rear wall portion. The bottom portion extends in the left-right direction. The rear wall portion extends upward from the back end of the bottom portion. The front wall portion extends upward from the front end of the bottom portion. This recess is an existing vehicle structure in the open cabin electric wheeled vehicle.

In the open cabin electric wheeled vehicle of (1), a suitable design has been devised with respect to the positional relationship among the recess, the large-capacity driving battery, the fuel-type electric power generation apparatus and the passage region. Specifically, as seen from the leftward direction or the rightward direction, between the large-capacity driving battery and the fuel-type electric power generation apparatus, the recess overlaps with the passage region so that the bottom end of the front wall portion, the bottom end of the rear wall portion and the bottom portion are located further downward than the top end of the large-capacity driving battery and the top end of the fuel-type electric power generation apparatus. Thus, the recess is located between the large-capacity driving battery and the fuel-type electric power generation apparatus. Hence, in the open cabin electric wheeled vehicle of (1), by utilizing the existing recess, interaction between the large-capacity driving battery and the fuel-type electric power generation apparatus can be inhibited without applying any new measures to the open cabin electric wheeled vehicle. As a result, according to the open cabin electric wheeled vehicle of (1), in an open cabin electric wheeled vehicle comprising a large-capacity driving battery which has a volume energy density higher than the volume energy density of a lead storage battery and which supplies electric power to a driving electric motor, and a fuel-type electric power generation apparatus that generates electric power using a fuel, complication of the vehicle structure of the open cabin electric wheeled vehicle can be suppressed.

An open cabin electric wheeled vehicle of (2) is in accordance with the open cabin electric wheeled vehicle of (1), wherein:

the large-capacity driving battery stores electric power converted by the fuel-type electric power generation apparatus.

An open cabin electric wheeled vehicle of (3) is in accordance with the open cabin electric wheeled vehicle of (1) or (2), wherein:

a bottom end of the large-capacity driving battery and a bottom end of the fuel-type electric power generation apparatus are not located further downward than the bottom end of the front wall portion, the bottom end of the rear wall portion, and the bottom portion.

According to the open cabin electric wheeled vehicle (3), interaction between the large-capacity driving battery and the fuel-type electric power generation apparatus can be inhibited to a greater degree. More specifically, the bottom end of the large-capacity driving battery and the bottom end of the fuel-type electric power generation apparatus are not located further downward than the bottom end of the front wall portion, the bottom end of the rear wall portion and the bottom portion. Thus, when seen from a frontward direction or a rearward direction, the large-capacity driving battery does not protrude downward from the bottom end of the front wall portion, the bottom end of the rear wall portion, and the bottom portion. When seen from the frontward direction or the rearward direction, the fuel-type electric power generation apparatus does not protrude downward from the bottom end of the front wall portion, the bottom end of the rear wall portion, and the bottom portion. In other words, the recess exists between the bottom end of the large-capacity driving battery and the bottom end of the fuel-type electric power generation apparatus. Consequently, according to the open cabin electric wheeled vehicle of (3), interaction between the large-capacity driving battery and the fuel-type electric power generation apparatus can be inhibited to a greater degree.

An open cabin electric wheeled vehicle of (4) is in accordance with the open cabin electric wheeled vehicle of any one of (1) to (3), wherein:

the vehicle body includes a first chamber that includes the rear wall portion, and a second chamber that includes the front wall portion;

the first chamber houses the fuel-type electric power generation apparatus; and the second chamber houses the large-capacity driving battery.

An open cabin electric wheeled vehicle of (5) is in accordance with the open cabin electric wheeled vehicle of (4), further comprising:

a front seat and a rear seat for the people to sit on;
wherein:
the front seat is disposed above the second chamber, and the rear seat is disposed above the first chamber.

An open cabin electric wheeled vehicle of (6) is in accordance with the open cabin electric wheeled vehicle of any one of (1) to (5), wherein:
the large-capacity driving battery is a lithium-ion secondary battery, a nickel-cadmium storage battery, a nickel-hydride storage battery or an all-solid-state battery.

An open cabin electric wheeled vehicle of (7) is in accordance with the open cabin electric wheeled vehicle of any one of (1) to (6), wherein:
the fuel-type electric power generation apparatus is a fuel cell stack that generates electric power using hydrogen.

An open cabin electric wheeled vehicle of (8) is in accordance with the open cabin electric wheeled vehicle of any one of (1) to (7), wherein:
the bottom portion is a part of a floor of the vehicle body.

An open cabin electric wheeled vehicle of (9) is in accordance with the open cabin electric wheeled vehicle of any one of (1) to (8), wherein:
feet of the people are placed on the bottom portion, or the baggage is loaded on the bottom portion.

The aforementioned objects and other objects, features, aspects and advantages of the present teaching will become more apparent from the following detailed description of embodiments of the present teaching that are described in association with the attached drawings.

As used herein, the term "and/or" includes any and all combinations of one or more of the associated listed items.

It will be further understood that the terms "including", "comprising" or "having" and variations thereof when used in this specification, specify the presence of stated features, steps, operations, elements, components, and/or their equivalents but do not preclude the presence or addition of one or more other features, steps, operations, elements, components and/or groups thereof.

Unless otherwise defined, all terms (including technical and scientific terms) used herein have the same meaning as commonly understood by one having ordinary skill in the art to which the present teaching belongs.

It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In describing the present teaching, it will be understood that a number of techniques and steps are disclosed. Each of these have individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the present teaching and the claims.

In the following description, for the purpose of explanation, numerous specific details are set forth in order to provide a thorough understanding of the present teaching. It will be evident, however, to one skilled in the art that the present teaching may be practiced without these specific details. The present disclosure is to be considered as an exemplification of the present teaching, and is not intended to limit the present teaching to the specific embodiments illustrated by the figures or description below.

Advantageous Effect of Invention

According to the present teaching, in an open cabin electric wheeled vehicle comprising a large-capacity driving battery which has a volume energy density higher than a volume energy density of a lead storage battery and which supplies electric power to a driving electric motor, and a fuel-type electric power generation apparatus that generates electric power using a fuel, complication of the vehicle structure of the open cabin electric wheeled vehicle can be suppressed.

BRIEF DESCRIPTION OF DRAWINGS

FIG. 8 is a left side view of an open cabin electric wheeled vehicle 1a.
FIG. 14 is a left side view of a recess 66, a fuel-type electric power generation apparatus 12 and a large-capacity driving battery 26.
FIG. 15 is a left side view of the recess 66, the fuel-type electric power generation apparatus 12 and the large-capacity driving battery 26.

DESCRIPTION OF EMBODIMENTS

Embodiment (Overall Configuration)

Figure 1:
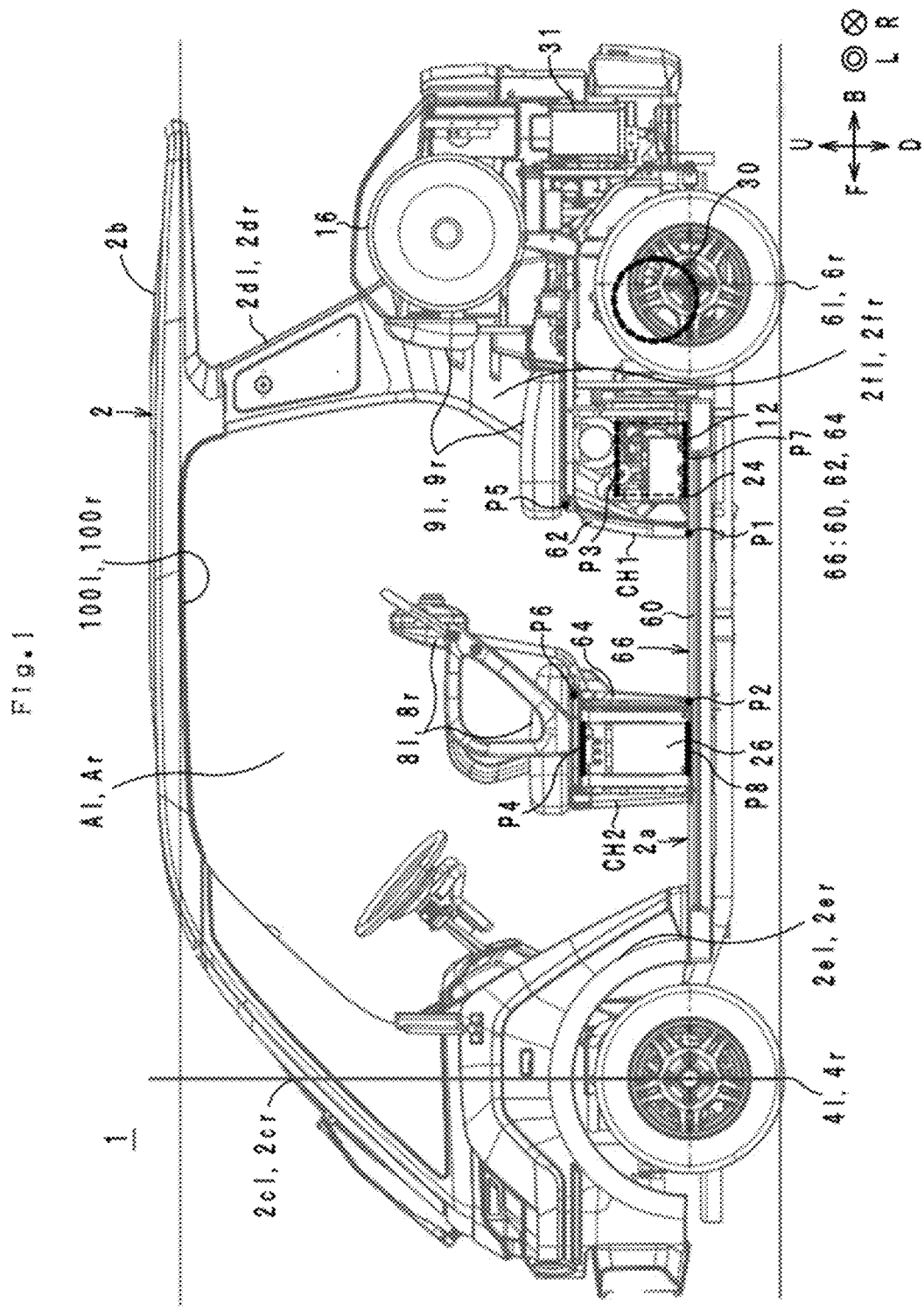
FIG. 1 is a left side view of an open cabin electric wheeled vehicle 1.
Figure 2:
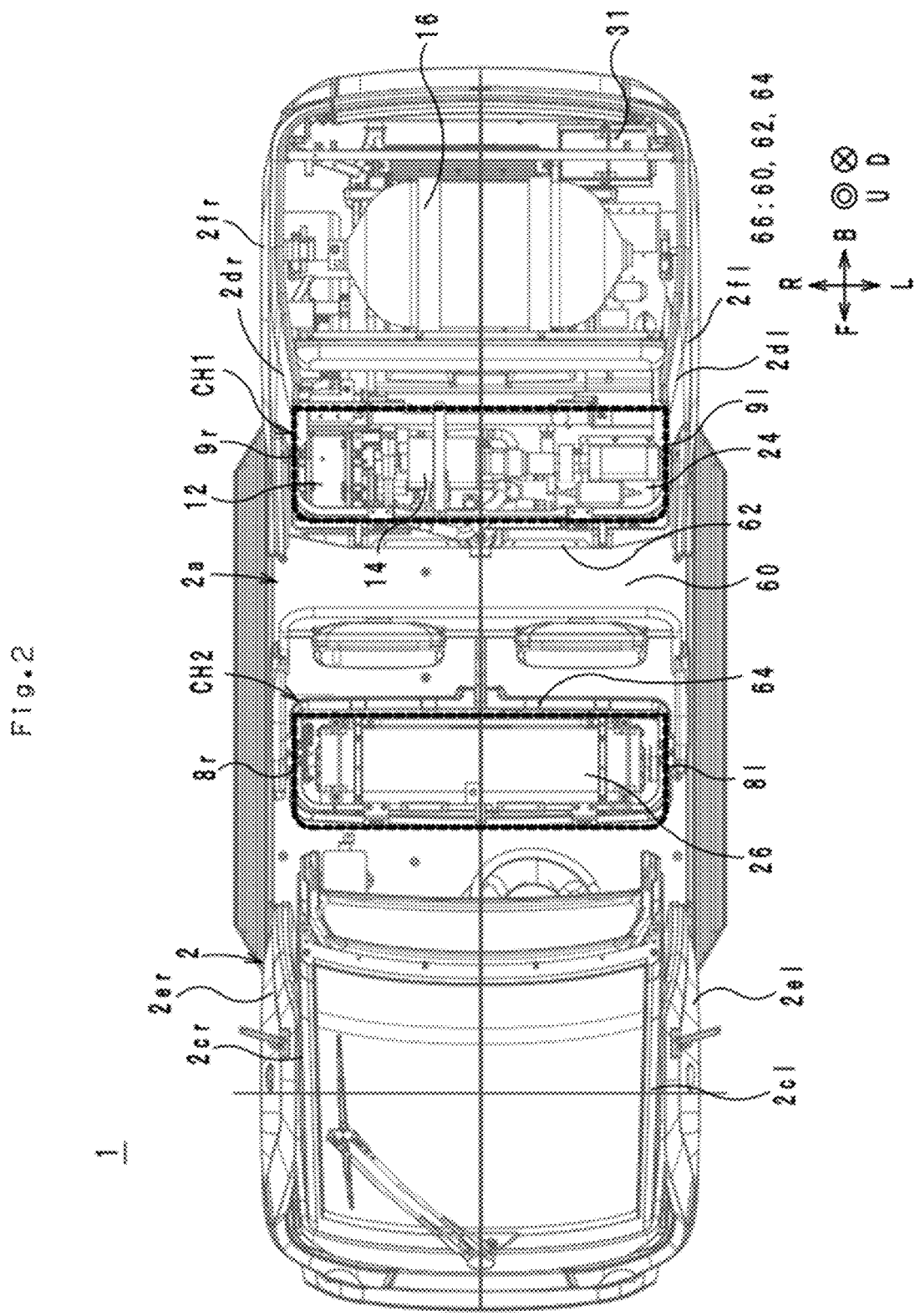
FIG. 2 is a top view of the open cabin electric wheeled vehicle 1.

Hereunder, an overall configuration of an open cabin electric wheeled vehicle 1 according to one embodiment of the present teaching is described while referring to the accompanying drawings. FIG. 1 is a left side view of the open cabin electric wheeled vehicle 1. FIG. 2 is a top view of the open cabin electric wheeled vehicle 1. FIG. 1 and FIG. 2 are perspective views in which an inner structure of the open cabin electric wheeled vehicle 1 is visible.

Hereinafter, an open cabin electric-wheeled-vehicle (1) travelling direction is defined as a frontward direction "F". An open cabin electric-wheeled-vehicle (1) backward direction is defined as a backward direction "B". An open cabin electric-wheeled-vehicle (1) leftward direction is defined as a leftward direction "L". An open cabin electric-wheeled-vehicle (1) rightward direction is defined as a rightward direction "R". An open cabin electric-wheeled-vehicle (1) upward direction is defined as an upward direction "U". An open cabin electric-wheeled-vehicle (1) downward direction is defined as a downward direction "D". An open cabin electric-wheeled-vehicle (1) front-back direction is defined as a front-back direction "FB". An open cabin electric-wheeled-vehicle (1) left-right direction is defined as a left-right direction "LR". An open cabin electric-wheeled-vehicle (1) up-down direction is defined as an up-down direction "UD". The up-down direction UD matches a vertical direction.

In the present specification, an axis or a member extending in the front-back direction does not necessarily refer to only an axis or a member that is parallel with the front-back direction. In this specification, the phrase "an axis or a member extending in the front-back direction" includes an axis or a member that is inclined within a range of ±45° with respect to the front-back direction. Similarly, herein, the phrase "an axis or a member extending in the up-down direction" includes an axis or a member that is inclined within a range of ±45° with respect to the up-down direction. Likewise, herein, the phrase "an axis or a member extending in the left-right direction" includes an axis or a member that is inclined within a range of ±45° with respect to the left-right direction.

In the present specification, when any two members are defined as a first member and a second member, the relation between the any two members has the meaning as described hereunder. In the present specification, the phrase "a first member is supported by a second member" includes a case in which the first member is attached to the second member so as to be immovable with respect to the second member (that is, is secured thereto), and a case in which the first member is attached to the second member so as to be movable with respect to the second member. Further, the phrase "the first member is supported by the second member" includes both a case in which the first member is directly attached to the second member and a case in which the first member is attached to the second member via a third member.

In the present specification, the phrase "a first member and a second member which are aligned in the front-back direction" refers to the following state. Specifically, a state in which, when the first member and the second member are seen from a direction perpendicular to the front-back direction, both of the first member and the second member are disposed on any straight line extending in the front-back direction. In the present specification, the phrase "a first member and a second member which are aligned in the front-back direction when seen from the upward direction or downward direction" refers to the following state. Specifically, a state in which, when the first member and the second member are seen from the upward direction or downward direction, both of the first member and the second member are disposed on any straight line indicating the front-back direction. In this case, when the first member and the second member are seen from the leftward direction or rightward direction which differ from the upward direction and downward direction, either one of the first member and the second member need not be disposed on any straight line indicating the front-back direction. Note that the first member and the second member may be in contact with each other. The first member and the second member may also be apart from each other. A third member may be present between the first member and the second member. The foregoing definitions also apply to directions other than the front-back direction.

In the present specification, the phrase "a first member is disposed in front of a second member" indicates the following state. In other words, at least one part of the first member is disposed in a region through which the second member passes when moving parallelly in the frontward direction. Thus, the first member may fit in the region through which the second member passes when moving parallelly in the frontward direction, or may protrude from the region through which the second member passes when moving parallelly in the frontward direction. In this case, the first member and the second member are aligned in the front-back direction. This definition also applies to directions other than the front-back direction.

In the present specification, the phrase "a first member is disposed further forward than a second member" indicates the following state. Specifically, the first member is disposed in front of a plane which passes through a front end of the second member and is orthogonal to the front-back direction. In this case, the first member and the second member may be aligned in the front-back direction, or need not be aligned in the front-back direction. This definition also applies to directions other than the front-back direction.

In the present specification, the phrase "a first member is disposed in front of a second member as seen from the leftward direction or rightward direction" refers to the following state. Specifically, as seen from the leftward direction or rightward direction, at least one part of the first member is disposed in a region through which the second member passes when moving parallelly in the frontward direction. In this definition, the first member and the second member need not be aligned in the front-back direction in a three-dimensional space. This definition also applies to directions other than the front-back direction.

In the present specification, unless expressly stated otherwise, the respective parts of a first member are defined as follows. The term "front part" of the first member means the front half of the first member. The term "rear part" of the first member means the rear half of the first member. The term "left part" of the first member means the left half of the first member. The term "right part" of the first member means the right half of the first member. The term "upper part" of the first member means the upper half of the first member. The term "lower part" of the first member means the lower half of the first member. The term "top end" of the first member means the upper end of the first member. The term "bottom end" of the first member means the lower end of the first member. The term "front end" of the first member means the frontward end of the first member. The term "back end" of the first member means the backward end of the first member. The term "left end" of the first member means the end on the left side of the first member. The term "right end" of the first member means the end on the right side of the first member. The term "top end part" of the first member means the top end of the first member and the vicinity of the top end. The term "bottom end part" of the first member means the bottom end of the first member and the vicinity of the bottom end. The term "front end part" of the first member means the front end of the first member and the vicinity of the front end. The term "back end part" of the first member means the back end of the first member and the vicinity of the back end. The term "left end part" of the first member means the left end of the first member and the vicinity of the left end. The term "right end part" of the first member means the right end of the first member and the vicinity of the right end. The term "first member" means a member constituting part of the open cabin electric wheeled vehicle 1.

In the present specification, the phrase "a structure (member, space, or opening) is formed (positioned or provided) between the first member and the second member" means that the structure is present between the first member and the second member in a direction in which the first member and the second member are aligned. However, the structure may protrude or may not protrude from the first member or the second member in a direction orthogonal to the direction in which the first member and the second member are aligned.

The open cabin electric wheeled vehicle 1 is an electric vehicle in which the inside of the cabin and the outside of the cabin are constantly connected to each other, or in other words, the inside of the cabin is constantly exposed to the outside. A vehicle body 2 of the open cabin electric wheeled vehicle 1 includes a left entrance and exit opening portion 100*l* (described in detail later) and a right entrance and exit opening portion 100*r* (described in detail later) which allows people or baggage to pass through. No door is provided to cover the entire left entrance and exit opening portion 100*l* and the entire right entrance and exit opening portion 100*r* in the left entrance and exit opening portion 100*l* and the right entrance and exit opening portion 100*r*. However, the phrase "members which cover the entire left entrance and exit opening portion 100*l* and the entire right entrance and exit opening portion 100*r*" excludes curtains, or, curtains may be provided to cover the left entrance and exit opening portion 100*l* or the right entrance and exit opening portion 100*r*. This is because, even if curtains are provided, people or baggage can pass through the left entrance and exit opening portion 100*l* and the right entrance and exit opening portion 100*r*. Note that, the open cabin electric wheeled vehicle 1 may be equipped with a non-detachable roof or may be equipped with a detachable roof. Further, the open cabin electric wheeled vehicle 1 need not be equipped with a non-detachable roof or a detachable roof. The open cabin electric wheeled vehicle 1 is a four-seater electric vehicle. The open cabin electric wheeled vehicle 1 includes the vehicle body 2, a left front wheel 4*l*, a right front wheel 4*r*, a left rear wheel 6*l*, a right rear wheel 6*r*, a left front seat 8*l*, a right front seat 8*r*, a left rear seat 9*l* and a right rear seat 9*r*.

The vehicle body 2 forms a cabin that accommodates people or baggage. As illustrated in FIG. 1, the vehicle body 2 includes a floor 2*a*, a roof 2*b*, a left front pillar 2*cl*, a right front pillar 2*cr*, a left rear pillar 2*dl*, a right rear pillar 2*dr*, a left front fender 2*el*, a right front fender 2*er*, a left rear fender 2*fl* and a right rear fender 2*fr*. The floor 2*a* is a plate-shaped member that has an upper surface and an undersurface. In the present embodiment, the floor 2*a* includes a plurality of metal plates that are aligned in the front-back direction FB. The heights of the plurality of metal plates differ slightly from each other. Accordingly, there is a slight difference in level between the plurality of metal plates. However, the heights of the plurality of metal plates may be the same as each other. Further, the floor 2*a* may be a single metal plate. The floor 2*a* supports people or baggage from the downward direction D. Accordingly, the feet of people who are riding in the open cabin electric wheeled vehicle 1 contact the upper surface of the floor 2*a*. Baggage that has been loaded into the open cabin electric wheeled vehicle 1 contacts the upper surface of the floor 2*a*. Further, the floor 2*a* supports components of the open cabin electric wheeled vehicle 1 such as a fuel-type electric power generation apparatus 12, a DC/DC convertor 24 or a large-capacity driving battery 26, which are described later, from the downward direction D. The floor 2*a* is disposed at a lower part of the open cabin electric wheeled vehicle 1. As seen from the perspective of FIG. 2, the right front pillar 2*cr*, right rear pillar 2*dr*, right front fender 2*er*, right rear fender 2*fr*, right entrance and exit opening portion 100*r*, right front wheel 4*r*, right rear wheel 6*r*, right front seat 8*r*, and right rear seat 9*r* are not visible. However, the reference numerals are provided in FIG. 2 to represent these elements being located behind their left-side counterparts, the left front pillar 2*cl*, left rear pillar 2*dl*, left front fender 2*el*, etc., while having the same dimensions as their left-side counterparts.

The roof 2*b* covers people or baggage from the upward direction U. Thus, the roof 2*b* is disposed at the upper part of the open cabin electric wheeled vehicle 1. The roof 2*b* is disposed above the floor 2*a* in the upward direction U. The roof 2*b* is a plate-shaped member that has an upper surface and an undersurface.

The left front fender 2*el*, the right front fender 2*er*, the left rear fender 2*fl* and the right rear fender 2*fr* are supported by the floor 2*a*. The left front fender 2*el* is disposed at a part that is at the front left of the vehicle body 2. The left front fender 2*el* is disposed above the left front wheel 4*l* (described in detail later) in the upward direction U. As seen from the rightward direction R, the left front fender 2*el* has a semicircular shape that runs along the upper half of the left front wheel 4*l*. The right front fender 2*er* is disposed at a part that is at the front right of the vehicle body 2. The right front fender 2*er* is disposed above the right front wheel 4*r* (described in detail later) in the upward direction U. As seen from the rightward direction R, the right front fender 2*er* has a semicircular shape that runs along the upper half of the right front wheel 4*r*.

The left rear fender 2*fl* is disposed at a part that is at the rear left of the vehicle body 2. The left rear fender 2*fl* is disposed above the left rear wheel 6*l* (described in detail later) in the upward direction U. As seen from the rightward direction R, the left rear fender 2*fl* has a semicircular shape that runs along the upper half of the left rear wheel 6*l*. The right rear fender 2*fr* is disposed at a part that is at the rear right of the vehicle body 2. The right rear fender 2*fr* is disposed above the right rear wheel 6*r* (described in detail later) in the upward direction U. As seen from the rightward direction R, the right rear fender 2*fr* has a semicircular shape that runs along the upper half of the right rear wheel 6*r*.

The left front pillar 2*cl*, the right front pillar 2*cr*, the left rear pillar 2*dl* and the right rear pillar 2*dr* support the roof 2*b*. The left front pillar 2*cl* is connected to a part that is at the front left of the roof 2*b*, and the left front fender 2*el*. As seen from the leftward direction L or the rightward direction R, the left front pillar 2*cl* extends in the backward direction B and the upward direction U from the front end part of the vehicle body 2. The right front pillar 2*cr* is connected to a part that is at the front right of the roof 2*b*, and the right front fender 2*er*. As seen from the leftward direction L or the rightward direction R, the right front pillar 2*cr* extends backward direction B and the upward direction U from the front end part of the vehicle body 2.

The left rear pillar 2*dl* is connected to a part that is at the rear left of the roof 2*b*, and the left rear fender 2*fl*. As seen from the leftward direction L or the rightward direction R, the left rear pillar 2*dl* extends in the upward direction U from the rear part of the vehicle body 2. The right rear pillar 2*dr* is connected to a part that is at the rear right of the roof 2*b*, and the right rear fender 2*fr*. As seen from the leftward direction L or the rightward direction R, the right rear pillar 2*dr* extends in the upward direction U from the rear part of the vehicle body 2.

As illustrated in FIG. 2, the space between the left front pillar 2*cl* and the right front pillar 2*cr* is closed off by a transparent member (for example, window glass). The space between the left rear pillar 2*dl* and the right rear pillar 2*dr* is not closed off by a transparent member. As illustrated in FIG. 1, the space between the left front pillar 2*cl* and the left rear pillar 2*dl* is not closed off by a transparent member. As illustrated in FIG. 1, the space between the right front pillar 2*cr* and the right rear pillar 2*dr* is not closed off by a transparent member.

The vehicle body 2 includes the left entrance and exit opening portion 100*l* and the right entrance and exit opening portion 100*r*. The left entrance and exit opening portion 100*l* is provided in the left side face of the vehicle body 2. In the present embodiment, the left entrance and exit opening portion 100*l* is an opening that is provided in the left side face of the vehicle body 2. More precisely, the left entrance and exit opening portion 100*l* is the edge of an opening that is provided in the left side face of the vehicle body 2. As seen from the leftward direction L or the rightward direction R, in one embodiment, the left entrance and exit opening portion 100*l* has a hexagonal shape. The left entrance and exit opening portion 100*l* is formed by the floor 2*a*, the roof 2*b*, the left front pillar 2*cl*, the left rear pillar 2*dl*, the left front fender 2*el* and the left rear fender 2*fl*. Further, the left entrance and exit opening portion 100*l* has a left passage region Al which allows people or baggage to pass through. The phrase "left passage region Al which allows people or baggage to pass through" means that people or baggage can pass through the left passage region Al to move from inside the cabin to outside the cabin and that people or baggage can pass through the left passage region Al to move from outside the cabin to inside the cabin. As seen from the leftward direction L or the rightward direction R, the left passage region Al is a region that is surrounded by the edge of the opening (that is, the left entrance and exit opening portion 100*l*). By this means, the inside of the cabin and the outside of the cabin are connected to each other. However, the left entrance and exit opening portion 100*l* has no door.

The right entrance and exit opening portion 100*r* is provided in the right side face of the vehicle body 2. In the present embodiment, the right entrance and exit opening portion 100*r* is an opening that is provided in the right side face of the vehicle body 2. More precisely, the right entrance and exit opening portion 100*r* is the edge of an opening that is provided in the right side face of the vehicle body 2. As seen from the leftward direction L or the rightward direction R, in one embodiment, the right entrance and exit opening portion 100*r* has a hexagonal shape. The right entrance and exit opening portion 100*r* is formed by the floor 2*a*, the roof 2*b*, the right front pillar 2*cr*, the right rear pillar 2*dr*, the right front fender 2*er* and the right rear fender 2*fr*. Further, the right entrance and exit opening portion 100*r* has a right passage region Ar which allows people or baggage to pass through. As seen from the leftward direction L or the rightward direction R, the right passage region Ar is a region that is surrounded by the edge of the opening (that is, the right entrance and exit opening portion 100*r*). By this means, the inside of the cabin and the outside of the cabin are connected to each other. However, the right entrance and exit opening portion 100*r* has no door.

The vehicle body 2 also includes a rear chamber CH1 (first chamber) and a first front chamber CH2 (second chamber). The rear chamber CH1 is disposed at a rear lower part of the vehicle body 2 inside the cabin that the vehicle body 2 forms. The rear chamber CH1 is a box that has a rectangular parallelepiped shape. Accordingly, the rear chamber CH1 forms a space within the rear chamber CH1. However, the rear chamber CH1 is open at a rear face thereof. A bottom face portion that forms a bottom face of the rear chamber CH1 is a part of the floor 2*a*. Accordingly, the space formed by the rear chamber CH1 is located above the floor 2*a* in the upward direction U. The space formed by the rear chamber CH1 contacts the floor 2*a*. The rear chamber CH1 also includes a rear wall portion 62. The rear wall portion 62 is a front face portion that forms a front face of the rear chamber CH1. The rear wall portion 62 has a rectangular plate shape that has a front face and a rear face. A longitudinal direction of the rear wall portion 62 extends in the left-right direction LR. Note that, apart from the rear wall portion 62, the rear chamber CH1 also includes a left side face portion that forms a left side face of the rear chamber CH1, a right side face portion that forms a right side face of the rear chamber CH1, and a top surface portion that forms a top surface of the rear chamber CH1. However, a description of the left side face portion, the right side face portion and the top surface portion of the rear chamber CH1 is omitted here.

The first front chamber CH2 is disposed at a lower part of the vehicle body 2 inside the cabin that the vehicle body 2 forms. The first front chamber CH2 is disposed in front of the rear chamber CH1 in the frontward direction F. The first front chamber CH2 is a box that has a rectangular parallelepiped shape. Accordingly, the first front chamber CH2 forms a space inside the first front chamber CH2. A bottom face portion that forms a bottom face of the first front chamber CH2 is a part of the floor 2*a*. Accordingly, the space formed by the first front chamber CH2 is located above the floor 2*a* in the upward direction U. The space formed by the first front chamber CH2 contacts the floor 2*a*. The first front chamber CH2 also includes a front wall portion 64. The front wall portion 64 is a rear face portion that forms a rear face of the first front chamber CH2. The front wall portion 64 has a rectangular plate shape that has a front face and a rear face. A longitudinal direction of the front wall portion 64 extends in the left-right direction LR. Note that, apart from the front wall portion 64, the first front chamber CH2 also includes a front face portion that forms a front face of the first front chamber CH2, a left side face portion that forms a left side face of the first front chamber CH2, a right side face portion that forms a right side face of the first front chamber CH2, and a top surface portion that forms a top surface of the first front chamber CH2. However, a description of the front face portion, the left side face portion, the right side face portion and the top surface portion of the first front chamber CH2 is omitted here.

In one embodiment, the left front seat 8*l* is a seat in which a driver (person) sits. As illustrated in FIG. 2, the left front seat 8*l* is disposed above the left part of the first front chamber CH2 in the upward direction U. The right front seat 8*r* is a seat in which a passenger (person) sits. The right front seat 8*r* is disposed above the right part of the first front chamber CH2 in the upward direction U. Thus, as illustrated in FIG. 2, the left front seat 8*l* and the right front seat 8*r* are aligned in that order from the leftward direction L to the rightward direction R.

The left rear seat 9*l* is a seat in which a passenger (person) sits. The left rear seat 9*l* is disposed above the left part of the rear chamber CH1 in the upward direction U. Thus, the left rear seat 9*l* is disposed behind the left front seat 8*l* in the backward direction B. The right rear seat 9r is a seat in which a passenger (person) sits. The right rear seat 9r is disposed above the right part of the rear chamber CH1 in the upward direction U. Thus, the right rear seat 9r is disposed behind the right front seat 8r in the backward direction B. Further, as illustrated in FIG. 2, the left rear seat 9l and the right rear seat 9r are aligned in that order from the leftward direction L to the rightward direction R.

The left front wheel 4l is supported by the vehicle body 2. The left front wheel 4l is disposed at a part that is at the front left of the vehicle body 2. The right front wheel 4r is supported by the vehicle body 2. The right front wheel 4r is disposed at a part that is at the front right of the vehicle body 2. By operating the steering wheel, the driver steers the left front wheel 4l and the right front wheel 4r in the leftward direction L or the rightward direction R. In other words, the left front wheel 4l and the right front wheel 4r are steerable wheels.

The left rear wheel 6l is supported by the vehicle body 2. The left rear wheel 6l is disposed at a part that is at the rear left of the vehicle body 2. The right rear wheel 6r is supported by the vehicle body 2. The right rear wheel 6r is disposed at a part that is at the rear right of the vehicle body 2. The left rear wheel 6l and the right rear wheel 6r are caused to rotate by a driving force which a driving electric motor 30, described later, generates. In other words, the left rear wheel 6l and the right rear wheel 6r are driving wheels.

(Regarding Motive Power System)

Figure 3:
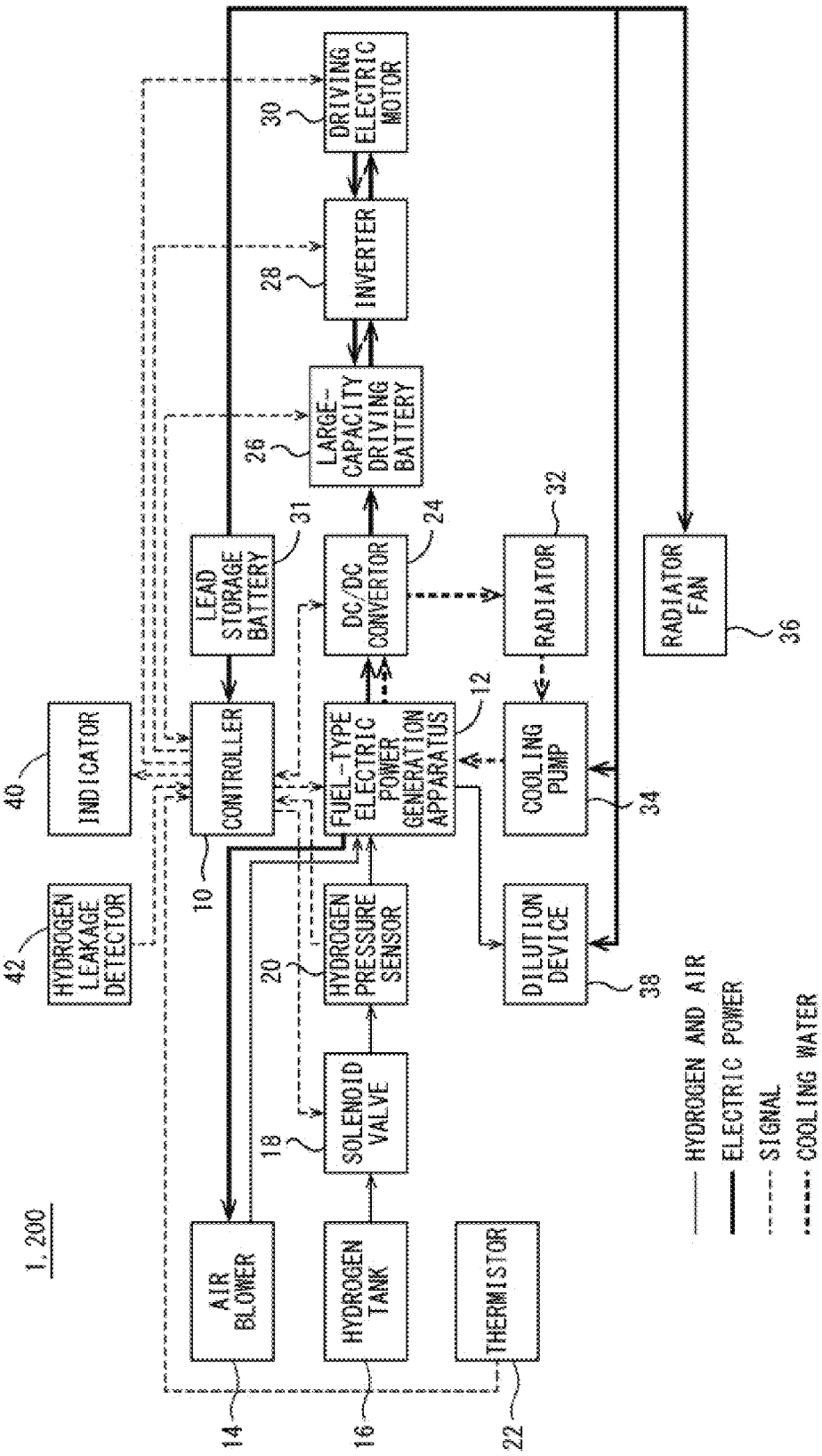
FIG. 3 is a block diagram illustrating a motive power system 200 of the open cabin electric wheeled vehicle 1.

Next, a motive power system 200 of the open cabin electric wheeled vehicle 1 will be described while referring to the accompanying drawings. FIG. 3 is a block diagram illustrating the motive power system 200 of the open cabin electric wheeled vehicle 1.

As illustrated in FIG. 3, the open cabin electric wheeled vehicle 1 includes, as the motive power system 200, a controller 10, the fuel-type electric power generation apparatus 12, an air blower 14, a hydrogen tank 16, a solenoid valve 18, a hydrogen pressure sensor 20, a thermistor 22, the DC/DC convertor 24, the large-capacity driving battery 26, an inverter 28, the driving electric motor 30, a lead storage battery 31, a radiator 32, a cooling pump 34, a radiator fan 36, a dilution device 38, an indicator 40, and a hydrogen leakage detector 42.

The hydrogen tank 16 stores hydrogen in a high-pressure state. The hydrogen tank 16 and the fuel-type electric power generation apparatus 12 (described in detail later) are connected by piping. The solenoid valve 18 is provided in the piping that connects the hydrogen tank 16 and the fuel-type electric power generation apparatus 12. Opening or closing in accordance with a control signal that the controller 10 (described in detail later) outputs, the solenoid valve 18 switches between starting supply of hydrogen from the hydrogen tank 16 to the fuel-type electric power generation apparatus 12 and stopping the supply of hydrogen.

The hydrogen pressure sensor 20 is provided in the piping that connects the hydrogen tank 16 and the fuel-type electric power generation apparatus 12. The hydrogen pressure sensor 20 detects the pressure inside the piping that connects the hydrogen tank 16 and the fuel-type electric power generation apparatus 12, and outputs a detection signal to the controller 10. Note that only one hydrogen pressure sensor 20 may be provided, or two hydrogen pressure sensors 20 may be provided. The thermistor 22 detects the temperature of the hydrogen tank 16, and outputs a detection signal to the controller 10.

The air blower 14 supplies air that includes oxygen to the fuel-type electric power generation apparatus 12 from outside the motive power system 200. The air blower 14 is driven by electric power that the fuel-type electric power generation apparatus 12 generates.

The fuel-type electric power generation apparatus 12 generates electric power using a fuel. In the present embodiment the fuel-type electric power generation apparatus 12 is a fuel cell stack that generates electric power using hydrogen. The fuel-type electric power generation apparatus 12, for example, has a stack structure in which several tens of cells to several hundreds of cells are stacked. Each cell has a membrane electrode assembly and a pair of separators. The membrane electrode assembly is disposed between the pair of separators. The membrane electrode assembly has an anode electrode (negative electrode), a cathode electrode (positive electrode) and a solid polymer electrolyte membrane. The solid polymer electrolyte membrane is disposed between the anode electrode and the cathode electrode. The anode electrode and the cathode electrode are formed of a catalyst layer that contacts the solid polymer electrolyte membrane and carries out an oxidation-reduction reaction, and a gas diffusion layer that contacts the catalyst layer. Hydrogen is supplied from the hydrogen tank 16 to an anode flow path that is formed on the anode electrode side. Air that includes oxygen is supplied from the air blower 14 to a cathode flow path that is formed on the cathode electrode side. By this means, the fuel-type electric power generation apparatus 12 generates power by a chemical reaction between hydrogen and oxygen.

Note that, in the present specification, the fuel-type electric power generation apparatus 12 indicates a portion having a function that generates electric power using a fuel, and hence does not include a portion that does not relate to the function that generates electric power using a fuel. When the fuel-type electric power generation apparatus 12 is a fuel cell stack, the fuel-type electric power generation apparatus 12 is a plurality of cells and a case that houses the plurality of cells. The fuel-type electric power generation apparatus 12 does not include piping that is connected to the case. Further, the fuel-type electric power generation apparatus 12 does not include a controller that controls operation of the fuel-type electric power generation apparatus 12.

The large-capacity driving battery 26 stores electric power which the fuel-type electric power generation apparatus 12 converted (generated). The large-capacity driving battery 26 supplies electric power to the driving electric motor 30. The large-capacity driving battery 26 has a volume energy density higher than the volume energy density of a lead storage battery. The term "volume energy density" refers to the amount of electric power that a battery can store per unit volume. In the present embodiment, the large-capacity driving battery 26 is a lithium-ion secondary battery. However, the large-capacity driving battery 26 may be a nickel-cadmium storage battery, a nickel-hydride storage battery, an all-solid-state battery or a metal-air battery, and may be a battery other than a battery exemplified herein.

The DC/DC convertor 24 raises the voltage of electric power that the fuel-type electric power generation apparatus 12 outputs. The electric power whose voltage is raised is output from the DC/DC convertor 24 to the large-capacity driving battery 26. By this means the large-capacity driving battery 26 is charged.

The inverter 28 converts electric power that is output from the large-capacity driving battery 26 into alternating-current power from direct-current power, and outputs the alternating-current power to the driving electric motor 30. The driving electric motor 30 generates a driving force that causes the left rear wheel 6l and the right rear wheel 6r to rotate. In the present embodiment, the driving electric motor 30 is an alternating-current motor that is driven by alternating-current power which is output from the inverter 28.

Note that, the driving electric motor 30 generates alternating-current power during deceleration of the open cabin electric wheeled vehicle 1. The inverter 28 converts electric power which is output from the driving electric motor 30 into direct-current power from alternating-current power, and outputs the direct-current power to the large-capacity driving battery 26. By this means the large-capacity driving battery 26 is charged.

The lead storage battery 31 stores electric power. The lead storage battery 31 supplies electric power to the controller 10, the cooling pump 34, the radiator fan 36 and the dilution device 38. The lead storage battery 31 serves a role of driving the controller 10, the cooling pump 34, the radiator fan 36 and the dilution device 38 when the motive power system 200 is activated.

The fuel-type electric power generation apparatus 12 and the DC/DC convertor 24 are cooled by cooling water. Specifically, the radiator 32 and the cooling pump 34 are connected by piping. The cooling pump 34 and the fuel-type electric power generation apparatus 12 are connected by piping. The fuel-type electric power generation apparatus 12 and the DC/DC convertor 24 are connected by piping. The DC/DC convertor 24 and the radiator 32 are connected by piping.

The radiator 32 cools cooling water inside the radiator 32 by means of an airstream generated by the radiator fan 36. The cooling pump 34 pumps out cooling water that is cooled by the radiator 32. The cooling water that is pumped out by the cooling pump 34 passes through the fuel-type electric power generation apparatus 12 and the DC/DC convertor 24. Thus, the fuel-type electric power generation apparatus 12 and the DC/DC convertor 24 are cooled by the cooling water. The cooling water that passed through the fuel-type electric power generation apparatus 12 and the DC/DC convertor 24 flows into the radiator 32.

The dilution device 38 dilutes hydrogen by mixing hydrogen discharged from the fuel-type electric power generation apparatus 12 and air.

The indicator 40 notifies information such as a remaining amount of hydrogen inside the hydrogen tank 16 or a remaining amount of electric power of the large-capacity driving battery 26 to the driver or a passenger. The indicator 40 is provided in an instrument panel of the vehicle body 2.

The hydrogen leakage detector 42 is a sensor that detects the occurrence of a hydrogen leakage in the open cabin electric wheeled vehicle 1. The hydrogen leakage detector 42, for example, detects the hydrogen concentration, and outputs a detection signal to the controller 10.

The controller 10 controls operations of the fuel-type electric power generation apparatus 12, the solenoid valve 18, the DC/DC convertor 24, the large-capacity driving battery 26, the inverter 28 and the driving electric motor 30 based on detection signals from the hydrogen pressure sensor 20, detection signals from the thermistor 22 and detection signals from the hydrogen leakage detector 42 and the like. Since operations of the controller 10 are the same as operations of a common controller for a fuel cell vehicle, a description thereof is omitted here. The controller 10 is constituted by a combination of a circuit board, an IC, a memory and electronic components and the like. The controller 10 is constituted by a plurality of controllers. The plurality of controllers include a controller that controls the fuel-type electric power generation apparatus 12, a controller that controls the DC/DC convertor 24 and the like. The plurality of controllers are housed in separate housings. However, the plurality of controllers may be integrated and housed in a single housing.

(Regarding Arrangement of Each Component of Motive Power System)

Figure 4:
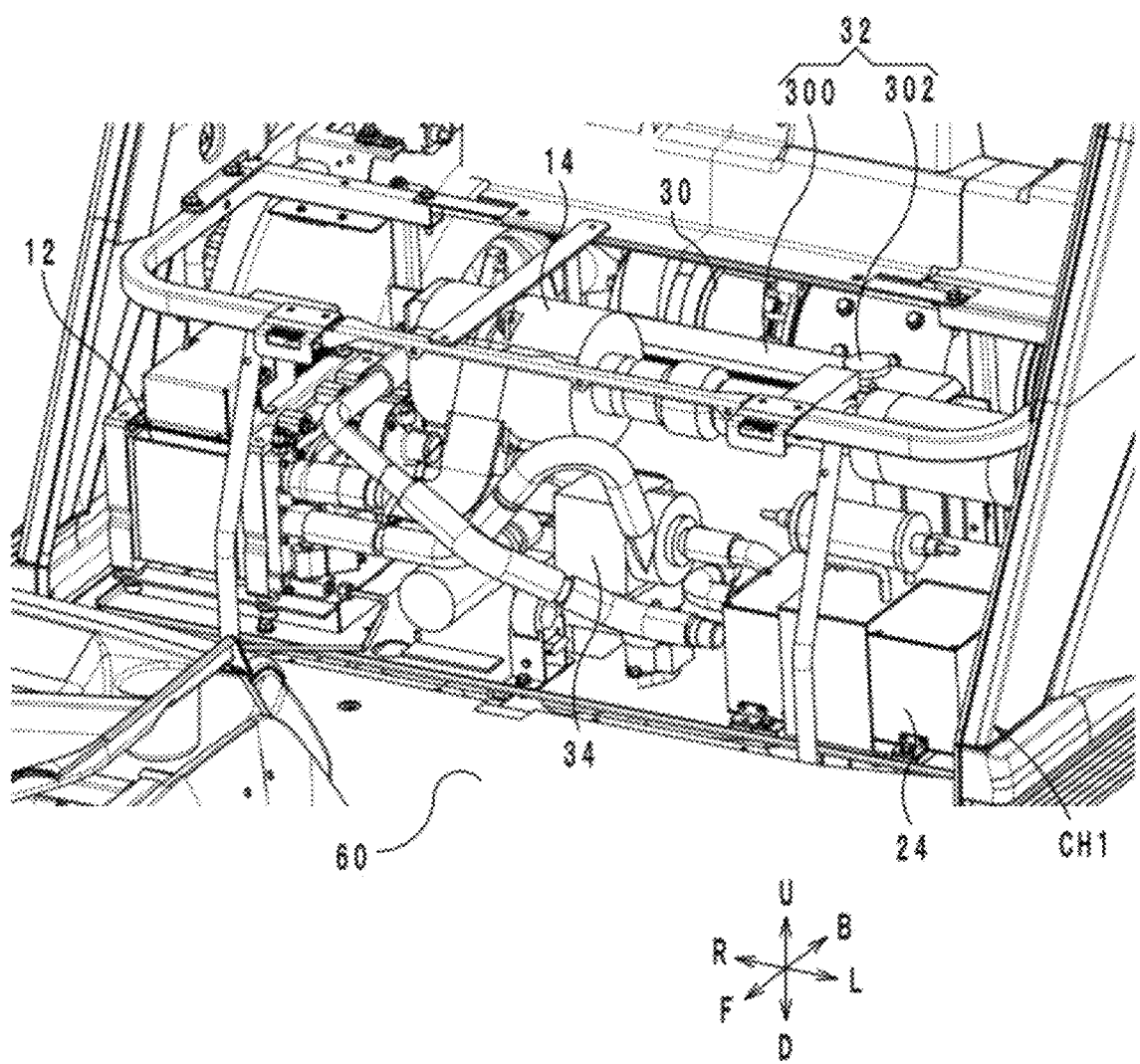
FIG. 4 is an oblique view illustrating an inner structure of a rear chamber CH1.
Figure 5:
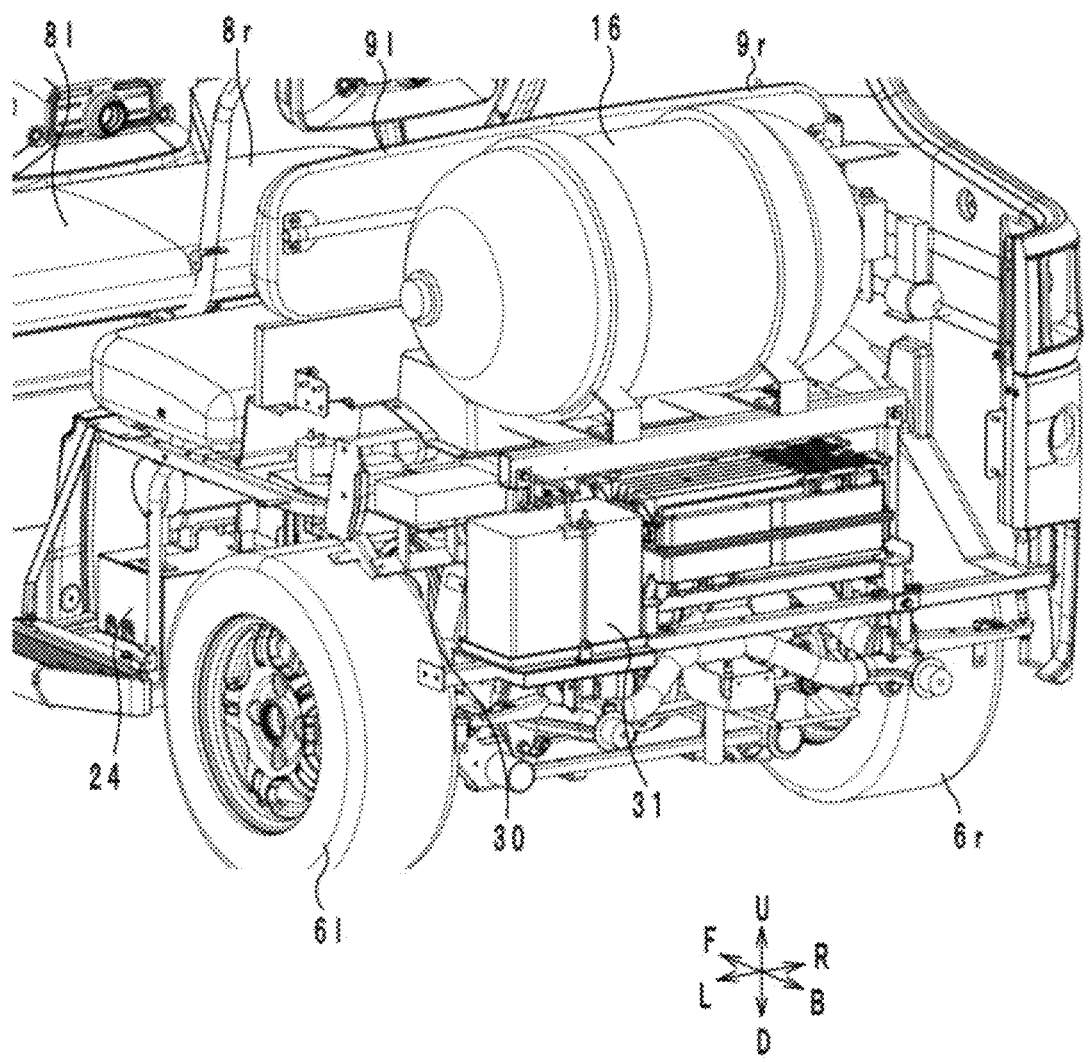
FIG. 5 is an oblique view illustrating the inner structure of a rear part of the open cabin electric wheeled vehicle 1.
Figure 6:
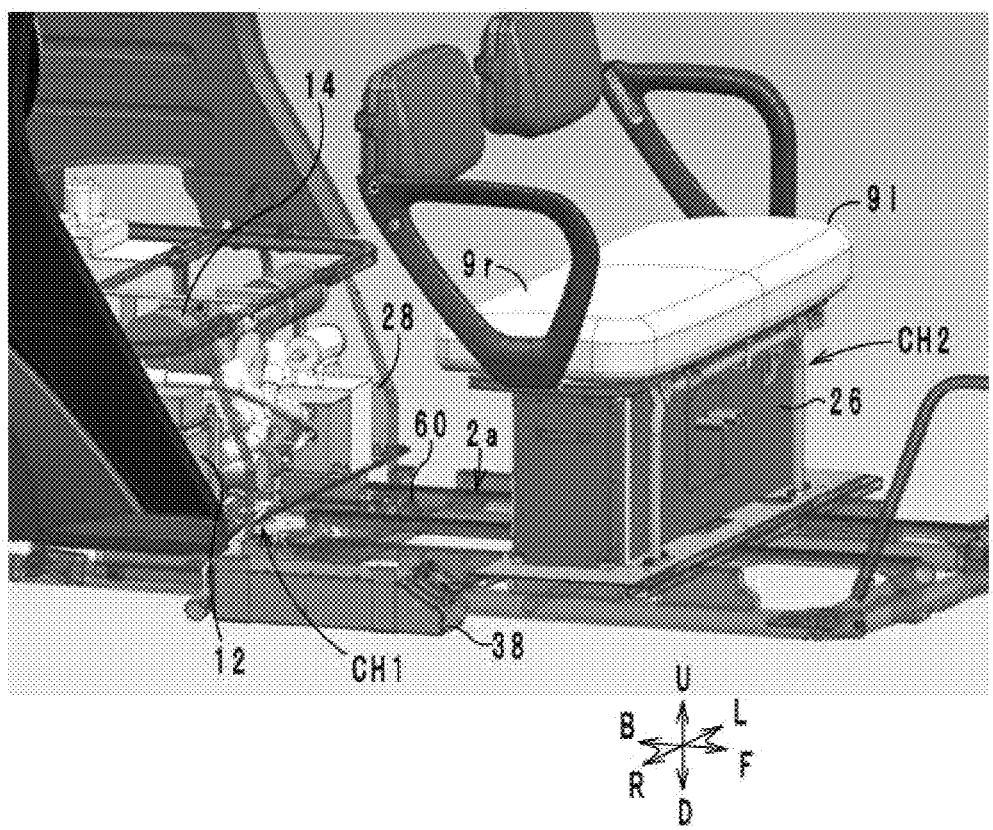
FIG. 6 is an oblique view illustrating the inner structure of the rear chamber CH1 and an inner structure of a first front chamber CH2.

Next, the arrangement of each component of the motive power system 200 of the open cabin electric wheeled vehicle 1 will be described while referring to the accompanying drawings. FIG. 4 is an oblique view illustrating the inner structure of the rear chamber CH1. FIG. 5 is an oblique view illustrating the inner structure of the rear part of the open cabin electric wheeled vehicle 1. FIG. 6 is an oblique view illustrating the inner structure of the rear chamber CH1 and the first front chamber CH2.

As illustrated in FIG. 4, the rear chamber CH1 houses the fuel-type electric power generation apparatus 12, the air blower 14, the DC/DC convertor 24, the radiator 32 and the cooling pump 34. The fuel-type electric power generation apparatus 12 has a rectangular parallelepiped shape. The fuel-type electric power generation apparatus 12 is disposed at the right end part of the space which the rear chamber CH1 forms. The fuel-type electric power generation apparatus 12 is fixed to the upper surface of the floor 2a through a fixing member. Therefore, the bottom face of the fuel-type electric power generation apparatus 12 is separated slightly in the upward direction U from the upper surface of the floor 2a.

The air blower 14 has a cylindrical shape which has a central axis line extending in the left-right direction LR. The air blower 14 is disposed to the left of the fuel-type electric power generation apparatus 12 in the leftward direction L in the space that the rear chamber CH1 forms. The air blower 14 is supported by piping. The air blower 14 is separated in the upward direction U from the upper surface of the floor 2a.

The DC/DC convertor 24 has a rectangular parallelepiped shape. The DC/DC convertor 24 is disposed at the left end part of the space which the rear chamber CH1 forms. The DC/DC convertor 24 is fixed to the upper surface of the floor 2a through a fixing member. Therefore, the bottom face of the DC/DC convertor 24 is separated slightly in the upward direction U from the upper surface of the floor 2a.

The radiator 32 has a rectangular plate shape which has a front face and a rear face. The radiator 32 is disposed at the rear part of the rear chamber CH1.

The cooling pump 34 has a rectangular parallelepiped shape. The cooling pump 34 is disposed to the lower left of the air blower 14 in the left-downward direction LD in the space which the rear chamber CH1 forms. As illustrated in FIG. 4, the cooling pump 34 has a rectangular parallelepiped shape. The cooling pump 34 is fixed to the upper surface of the floor 2a through a fixing member. Therefore, the bottom face of the cooling pump 34 is separated slightly in the upward direction U from the upper surface of the floor 2a.

As illustrated in FIG. 1, the first front chamber CH2 houses the large-capacity driving battery 26. Thus, the large-capacity driving battery 26 is disposed in front of the fuel-type electric power generation apparatus 12 in the frontward direction F. The large-capacity driving battery 26 has a rectangular parallelepiped shape. The large-capacity driving battery 26 is disposed in the space which the first front chamber CH2 forms. The large-capacity driving battery 26 is fixed to the upper surface of the floor 2a. Therefore, the bottom face of the large-capacity driving battery 26 and the upper surface of the floor 2a are in contact with each other.

As illustrated in FIG. 4, the driving electric motor 30 has a cylindrical shape which has a central axis line extending in the left-right direction LR. The driving electric motor 30 is disposed between the left rear wheel 6*l* (see FIG. 1) and the right rear wheel 6*r* (see FIG. 1).

As illustrated in FIG. 5, the hydrogen tank 16 has a cylindrical shape which has a central axis line extending in the left-right direction LR. The hydrogen tank 16 is disposed behind the left rear seat 9*l* and the right rear seat 9*r* in the backward direction B. As seen from the leftward direction L or the rightward direction R, the hydrogen tank 16 is disposed above the left rear wheel 6*l* and the right rear wheel 6*r* in the upward direction U.

The lead storage battery 31 has a rectangular parallelepiped shape. The lead storage battery 31 is disposed below the left part of the hydrogen tank 16 in the downward direction D.

As illustrated in FIG. 6, the dilution device 38 is disposed to the right of the floor 2*a* in the rightward direction R. Thus, the dilution device 38 is disposed further downward in the downward direction D than a purge port through which the fuel-type electric power generation apparatus 12 discharges hydrogen. Hydrogen and water are discharged from the purge port. The dilution device 38 separates the hydrogen and water that are discharged from the purge port, and dilutes the hydrogen that is discharged from the purge port.
(Regarding Positional Relationship Among Recess, Fuel-Type Electric Power Generation Apparatus, and Large-Capacity Driving Battery)

Next, the positional relationship among a recess, the fuel-type electric power generation apparatus and the large-capacity driving battery will be described while referring to FIG. 1.

As illustrated in FIG. 1, the vehicle body 2 includes a recess 66. The recess 66 is a portion that has a hollow shape in the downward direction D as seen from the leftward direction L or the rightward direction R. The recess 66 has an angular U-shape as seen from the leftward direction L or the rightward direction R. The recess 66 has a bottom portion 60, the rear wall portion 62 and the front wall portion 64. The bottom portion 60 is one part of the floor 2*a*. Specifically, of the entire floor 2*a*, the bottom portion 60 is a portion that is located between the rear chamber CH1 and the first front chamber CH2. The rear chamber CH1 and the first front chamber CH2 have a rectangular parallelepiped shape that extends in the left-right direction LR. Therefore, as illustrated in FIG. 2, as seen from the downward direction D, the bottom portion 60 has a rectangular shape that has long sides extending in the left-right direction LR. The front end of the bottom portion 60 is a long side of the bottom portion 60 that extends along the first front chamber CH2. The back end of the bottom portion 60 is a long side of the bottom portion 60 that extends along the rear chamber CH1. The feet of a passenger (person) sitting in a rear seat 9 are placed on the bottom portion 60. Note that, baggage may also be loaded on the bottom portion 60.

The rear wall portion 62 extends in the upward direction U from the back end of the bottom portion 60. In the present embodiment, an angle formed by the front face of the rear wall portion 62 and the upper surface of the floor 2*a* is approximately vertical. The front wall portion 64 extends in the upward direction U from the front end of the bottom portion 60. In the present embodiment, an angle formed by the rear face of the front wall portion 64 and the upper surface of the floor 2*a* is approximately vertical.

As seen from the leftward direction L or the rightward direction R, the recess 66 overlaps with the left passage region A*l* and the right passage region A*r*. In addition, the recess 66 is located between the large-capacity driving battery 26 and the fuel-type electric power generation apparatus 12. Thus, as seen from the leftward direction L or the rightward direction R, the recess 66 overlaps with the left passage region A*l* and the right passage region A*r* between the large-capacity driving battery 26 and the fuel-type electric power generation apparatus 12 so that a bottom end P2 of the front wall portion 64, a bottom end P1 of the rear wall portion 62, and the bottom portion 60 are located further downward in the downward direction D than a top end P4 of the large-capacity driving battery 26 and a top end P3 of the fuel-type electric power generation apparatus 12.

More specifically, the large-capacity driving battery 26 is disposed above the floor 2*a* in the upward direction U. The bottom portion 60 is one part of the floor 2*a*. Accordingly, the top end P4 of the large-capacity driving battery 26 is located further upward in the upward direction U than the bottom portion 60.

The bottom end P1 of the rear wall portion 62 is in contact with the upper surface of the floor 2*a*. Accordingly, the position of the bottom end P1 of the rear wall portion 62 in the up-down direction UD is the same as the position of the bottom portion 60 in the up-down direction UD. Similarly, the bottom end P2 of the front wall portion 64 is in contact with the upper surface of the floor 2*a*. Accordingly, the position of the bottom end P2 of the front wall portion 64 in the up-down direction UD is the same as the position of the bottom portion 60 in the up-down direction UD. As described above, the top end P4 of the large-capacity driving battery 26 is located above the bottom portion 60 in the upward direction U. Therefore, the top end P4 of the large-capacity driving battery 26 is located above the bottom end P1 of the rear wall portion 62 and the bottom end P2 of the front wall portion 64 in the upward direction U.

The fuel-type electric power generation apparatus 12 is disposed behind the rear wall portion 62 in the backward direction B. Hence, the recess 66 is located in front of the fuel-type electric power generation apparatus 12 in the frontward direction F. The large-capacity driving battery 26 is disposed in front of the front wall portion 64 in the frontward direction F. Hence, the recess 66 is located behind the large-capacity driving battery 26 in the backward direction B. Thus, as seen from the leftward direction L or the rightward direction R, the recess 66 is located between the fuel-type electric power generation apparatus 12 and the large-capacity driving battery 26.

According to one embodiment, the left entrance and exit opening portion 100*l* and the right entrance and exit opening portion 100*r* have a hexagonal shape as seen from the leftward direction L or the rightward direction R. The side that is positioned furthest downward in the downward direction D of the left entrance and exit opening portion 100*l* and the right entrance and exit opening portion 100*r*, respectively, is referred to as "lower side" of the left entrance and exit opening portion 100*l* and the right entrance and exit opening portion 100*r*, respectively. As seen from the leftward direction L or the rightward direction R, the lower side of each of the left entrance and exit opening portion 100*l* and the right entrance and exit opening portion 100*r* extends in the front-back direction FB, and coincides with the upper surface of the floor 2*a*. Therefore, as seen from the leftward direction L or the rightward direction R, the lower side of each of the left entrance and exit opening portion 100*l* and the right entrance and exit opening portion 100*r* coincides with the upper surface of the bottom portion 60. Thus, as seen from the leftward direction L or the rightward direction R, the entire recess 66 fits within the left passage region Al of the left entrance and exit opening portion 100*l*. As seen from the leftward direction L or the rightward direction R, the entire recess 66 fits within the right passage region Ar of the right entrance and exit opening portion 100*r*.

As described above, as seen from the leftward direction L or the rightward direction R, the large-capacity driving battery 26, the recess 66 and the fuel-type electric power generation apparatus 12 are aligned in that order from the frontward direction F to the backward direction B. A part of each of the large-capacity driving battery 26 and the fuel-type electric power generation apparatus 12 overlaps with the recess 66 as seen from the frontward direction F or the backward direction B. In the present embodiment, as seen from the frontward direction F or the backward direction B, all of the large-capacity driving battery 26 and the fuel-type electric power generation apparatus 12 overlaps with the recess 66. Therefore, a top end P6 of the front wall portion 64 and a top end P5 of the rear wall portion 62 are located further upward in the upward direction U than a bottom end P8 of the large-capacity driving battery 26 and a bottom end P7 of the fuel-type electric power generation apparatus 12.

In this connection, as seen from the frontward direction F or the backward direction B, the large-capacity driving battery 26 and the fuel-type electric power generation apparatus 12 do not protrude in the downward direction D from the bottom end P1 of the rear wall portion 62, the bottom end P2 of the front wall portion 64, and the bottom portion 60. Therefore, the bottom end P8 of the large-capacity driving battery 26 and the bottom end P7 of the fuel-type electric power generation apparatus 12 are not located further downward in the downward direction D than the bottom end P1 of the rear wall portion 62, the bottom end P2 of the front wall portion 64, and the bottom portion 60. In other words, the bottom end P8 of the large-capacity driving battery 26 and the bottom end P7 of the fuel-type electric power generation apparatus 12 are located further upward in the upward direction U than the bottom end P1 of the rear wall portion 62, the bottom end P2 of the front wall portion 64, and the bottom portion 60 or are located at the same height as the bottom end P1 of the rear wall portion 62, the bottom end P2 of the front wall portion 64, and the bottom portion 60. In the present embodiment, the bottom end P8 of the large-capacity driving battery 26 is located at the same height as the bottom end P1 of the rear wall portion 62, the bottom end P2 of the front wall portion 64, and the bottom portion 60. The bottom end P7 of the fuel-type electric power generation apparatus 12 is located further upward in the upward direction U than the bottom end P1 of the rear wall portion 62, the bottom end P2 of the front wall portion 64, and the bottom portion 60.

In addition, as seen from frontward direction F or the backward direction B, the large-capacity driving battery 26 and the fuel-type electric power generation apparatus 12 do not protrude in the upward direction U from the front wall portion 64. In other words, the top end P4 of the large-capacity driving battery 26 and the top end P3 of the fuel-type electric power generation apparatus 12 are not located further upward in the upward direction U than the top end P6 of the rear wall portion 62 and the top end P5 of the front wall portion 64. In other words, the top end P4 of the large-capacity driving battery 26 and the top end P3 of the fuel-type electric power generation apparatus 12 are located further downward in the downward direction D than the top end P5 of the rear wall portion 62 and the top end P6 of the front wall portion 64 or are located at the same height as the top end P5 of the rear wall portion 62 and the top end P6 of the front wall portion 64. In the present embodiment, the top end P4 of the large-capacity driving battery 26 is located further downward in the downward direction D than the top end P5 of the rear wall portion 62 and the top end P6 of the front wall portion 64. The top end P3 of the fuel-type electric power generation apparatus 12 is located further downward in the downward direction D than the top end P5 of the rear wall portion 62 and the top end P6 of the front wall portion 64.

(Regarding Radiator Cap)

Figure 7:
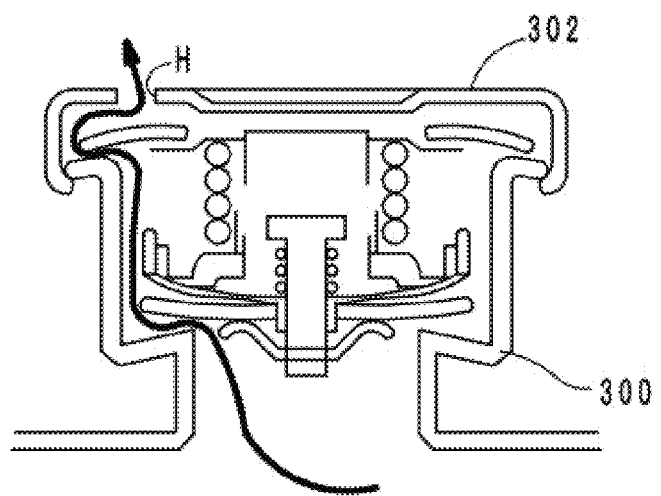
FIG. 7 is a cross-sectional structural view of a radiator cap 302.

Next, the structure of the radiator cap will be described while referring to the accompanying drawings. FIG. 7 is a cross-sectional structural drawing of a radiator cap 302.

As illustrated in FIG. 7, the radiator 32 includes a radiator body 300 and the radiator cap 302. The radiator body 300 includes a radiator core. As illustrated in FIG. 4, the radiator cap 302 is provided at the upper surface of the radiator body 300. The radiator cap 302 blocks a replenishment port for replenishing cooling water. The radiator cap 302 includes a thermostat that switches from a closed state to an open state at 120° C. As illustrated in FIG. 7, a hole H is provided in the radiator cap 302. The diameter of the hole H is, for example, 3 mm or more and 4 mm or less.

According to the radiator cap 302 having the above structure, a common radiator cap that is to be used in an automobile which has an engine can be utilized. More specifically, a common radiator cap that is used in an automobile which has an engine includes a thermostat that switches from a closed state to an open state at 120° C. On the other hand, in the open cabin electric wheeled vehicle 1, a fuel cell is used instead of an engine. In the open cabin electric wheeled vehicle 1, from the viewpoint of the power generating efficiency of the fuel cell, the thermostat of the radiator cap preferably switches from a closed state to an open state at a temperature within the range of 45° C. to 65° C. Therefore, in the open cabin electric wheeled vehicle 1, the operating temperature of the thermostat of the radiator cap differs from the operating temperature of the thermostat of a common radiator cap that is used in an automobile that has an engine. Consequently, it is difficult to apply a common radiator cap that is used in an automobile that has an engine as it is for use as the radiator cap of the open cabin electric wheeled vehicle 1.

Therefore, the radiator cap 302 has a structure in which the hole H is provided in a radiator cap that includes a thermostat that switches from a closed state to an open state at 120° C. By this means, the radiator 32 has a breather function. In other words, when the temperature of the cooling water rises and the pressure inside the radiator 32 increases, gas inside the radiator 32 flows out from the radiator 32 through the hole H. By this means, the pressure inside the radiator 32 is kept constant. Hence, the open cabin electric wheeled vehicle 1 need not include a reservoir tank. Thus, it is no longer necessary for the operating temperature of the thermostat of the radiator cap 302 to be within the range of 45° C. to 65° C. As a result, according to the radiator cap 302 having the above structure, a common radiator cap that is used in an automobile which has an engine can be utilized.

Note that, the radiator cap 302 may be provided at the top end of a conduit for cooling water (for example, a cooling hose), instead of at the upper surface of the radiator body 300. In this case, the top end of the cooling hose is, for example, located at approximately the same height as a portion at which the left rear seat 9*l* or the right rear seat 9*r* is attached to the vehicle body 2. Further, the radiator cap 302 is attached to the top end of the cooling hose. By this means, attachment and detachment of the radiator cap 302 is facilitated.

Advantageous Effects

According to the open cabin electric wheeled vehicle 1, complication of the vehicle structure of the open cabin electric wheeled vehicle 1 equipped with the large-capacity driving battery 26 and the fuel-type electric power generation apparatus 12 can be suppressed. More specifically, the open cabin electric wheeled vehicle 1 is equipped with the large-capacity driving battery 26 and the fuel-type electric power generation apparatus 12. In this case, a measure for inhibiting interaction between the large-capacity driving battery 26 and the fuel-type electric power generation apparatus 12 is required in the open cabin electric wheeled vehicle 1. However, newly providing a measure for inhibiting interaction between the large-capacity driving battery 26 and the fuel-type electric power generation apparatus 12 leads to complication of the vehicle structure of the open cabin electric wheeled vehicle 1.

Therefore, in the open cabin electric wheeled vehicle 1, by utilizing the existing recess 66, interaction between the large-capacity driving battery 26 and the fuel-type electric power generation apparatus 12 is inhibited while also suppressing complication of the vehicle structure of the open cabin electric wheeled vehicle 1. Specifically, the vehicle body 2 of the open cabin electric wheeled vehicle 1 includes the recess 66. The recess 66 has the bottom portion 60, the rear wall portion 62 and the front wall portion 64. The bottom portion 60 extends in the left-right direction LR. The rear wall portion 62 extends in the upward direction U from the back end of the bottom portion 60. The front wall portion 64 extends in the upward direction U from the front end of the bottom portion 60. The recess 66 is an existing vehicle structure in the open cabin electric wheeled vehicle 1.

In the open cabin electric wheeled vehicle 1, a suitable design has been devised with respect to the positional relationship among the recess 66, the large-capacity driving battery 26, the fuel-type electric power generation apparatus 12, the left passage region Al and the right passage region Ar. Specifically, as seen from the leftward direction L or the rightward direction R, the recess 66 overlaps with the left passage region Al and the right passage region Ar between the large-capacity driving battery 26 and the fuel-type electric power generation apparatus 12 so that the bottom end P1 of the rear wall portion 62, the bottom end P2 of the front wall portion 64, and the bottom portion 60 are located further downward in the downward direction D than the top end P4 of the large-capacity driving battery 26 and the top end P3 of the fuel-type electric power generation apparatus 12. Thus, the recess 66 is located between the large-capacity driving battery 26 and the fuel-type electric power generation apparatus 12. Hence, in the open cabin electric wheeled vehicle 1, by utilizing the existing recess 66, interaction between the large-capacity driving battery 26 and the fuel-type electric power generation apparatus 12 can be inhibited without providing a new measure in the open cabin electric wheeled vehicle 1. As a result, according to the open cabin electric wheeled vehicle 1, in the open cabin electric wheeled vehicle 1 equipped with the large-capacity driving battery 26 and the fuel-type electric power generation apparatus 12, it is possible to suppress complication of the vehicle structure of the open cabin electric wheeled vehicle 1.

Further, according to the open cabin electric wheeled vehicle 1, interaction between the large-capacity driving battery 26 and the fuel-type electric power generation apparatus 12 can be inhibited to a greater degree. More specifically, the bottom end P8 of the large-capacity driving battery 26 and the bottom end P7 of the fuel-type electric power generation apparatus 12 are not located further downward in the downward direction D than the bottom end P2 of the front wall portion 64, the bottom end P1 of the rear wall portion 62, and the bottom portion 60. Thus, as seen from the frontward direction F or the backward direction B, the large-capacity driving battery 26 does not protrude in the downward direction D from the bottom end P1 of the rear wall portion 62, the bottom end P2 of the front wall portion 64, and the bottom portion 60. As seen from the frontward direction F or the backward direction B, the fuel-type electric power generation apparatus 12 does not protrude in the downward direction D from the bottom end P1 of the rear wall portion 62, the bottom end P2 of the front wall portion 64, and the bottom portion 60. In other words, the recess 66 is located between the bottom end P8 of the large-capacity driving battery 26 and the bottom end P7 of the fuel-type electric power generation apparatus 12. As a result, according to the open cabin electric wheeled vehicle 1, interaction between the large-capacity driving battery 26 and the fuel-type electric power generation apparatus 12 can be inhibited to a greater degree.

First Modification

Figure 8:
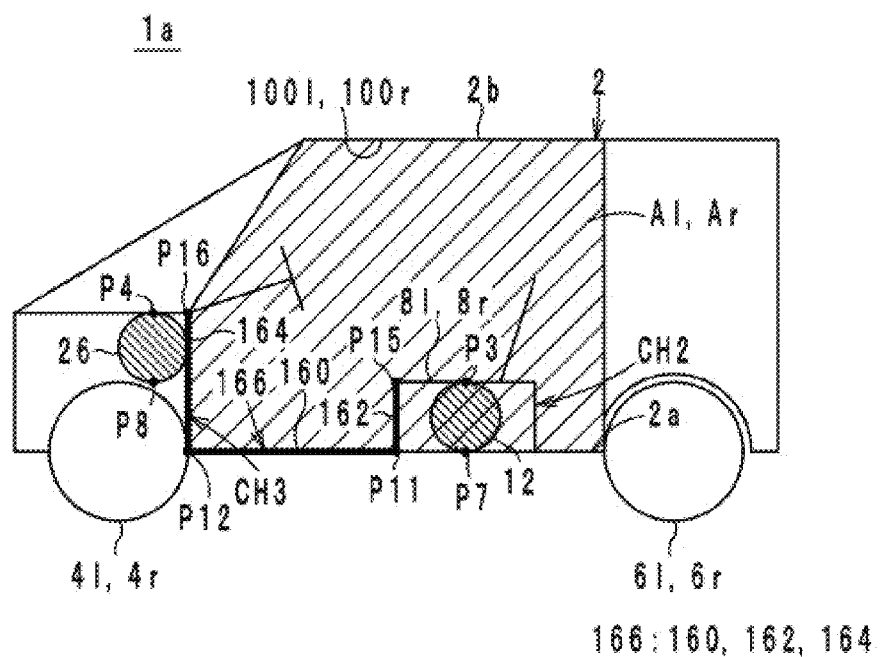

Hereunder, an open cabin electric wheeled vehicle 1a according to a first modification is described while referring to the accompanying drawings. FIG. 8 is a left side view of the open cabin electric wheeled vehicle 1a.

The open cabin electric wheeled vehicle 1a differs from the open cabin electric wheeled vehicle 1 in the following points.

(a) The open cabin electric wheeled vehicle 1a is not equipped with the left rear seat 9l, the right rear seat 9r and the rear chamber CH1.

(b) The open cabin electric wheeled vehicle 1a is equipped with a second front chamber CH3.

(c) The fuel-type electric power generation apparatus 12 is housed in the first front chamber CH2.

(d) The large-capacity driving battery 26 is housed in the second front chamber CH3.

Hereunder, the open cabin electric wheeled vehicle 1a is described, centering on the aforementioned points of difference. The vehicle body 2 of the open cabin electric wheeled vehicle 1a includes a recess 166. The recess 166 is a portion that has a hollow shape in the downward direction D as seen from the leftward direction L or the rightward direction R. The recess 166 has an angular U-shape as seen from the leftward direction L or the rightward direction R. The recess 166 has a bottom portion 160, a rear wall portion 162 and a front wall portion 164. The bottom portion 60 extends in the left-right direction LR at the front part of the cabin that the vehicle body 2 forms. The bottom portion 160 is one part of the floor 2a. The feet of the driver (person) sitting in the left front seat 8l and the feet of a passenger (person) sitting in the right front seat 8r are placed on the bottom portion 160. Note that, baggage may also be loaded on the bottom portion 160.

The fuel-type electric power generation apparatus 12 is housed in the first front chamber CH2. The first front chamber CH2 (first chamber) includes the rear wall portion 162. The rear wall portion 162 extends in the upward direction U from the back end of the bottom portion 160.

The second front chamber CH3 (second chamber) is disposed in front of the first front chamber CH2 in the frontward direction F. The second front chamber CH3 is located at the front end part of the vehicle body 2. The second front chamber CH3 includes the front wall portion 164. The front wall portion 164 extends in the upward direction U from the front end of the bottom portion 160.

In the open cabin electric wheeled vehicle 1a also, similarly to the open cabin electric wheeled vehicle 1, the recess 166 overlaps with the left passage region Al and the right passage region Ar as seen from the leftward direction L or the rightward direction R. In addition, the recess 166 is located between the large-capacity driving battery 26 and the fuel-type electric power generation apparatus 12. In other words, as seen from the leftward direction L or the rightward direction R, the recess 166 overlaps with the left passage region Al and the right passage region Ar between the large-capacity driving battery 26 and the fuel-type electric power generation apparatus 12 so that a bottom end P12 of the front wall portion 164, a bottom end P11 of the rear wall portion 162, and the bottom portion 160 are located further downward in the downward direction D than the top end P4 of the large-capacity driving battery 26 and the top end P3 of the fuel-type electric power generation apparatus 12. The remaining configuration of the open cabin electric wheeled vehicle 1a is the same as the configuration of the open cabin electric wheeled vehicle 1, and hence a description thereof is omitted here. As seen from the perspective of FIG. 8, the right entrance and exit opening portion 100r, right front wheel 4r, right rear wheel 6r, and right front seat 8r are not visible. However, the reference numerals are provided in FIG. 8 to represent these elements being located behind their left-side counterparts, as seen from the side perspective of FIG. 8, while having the same dimensions as their left-side counterparts visible in FIG. 8.

Second Modification

Figure 9:
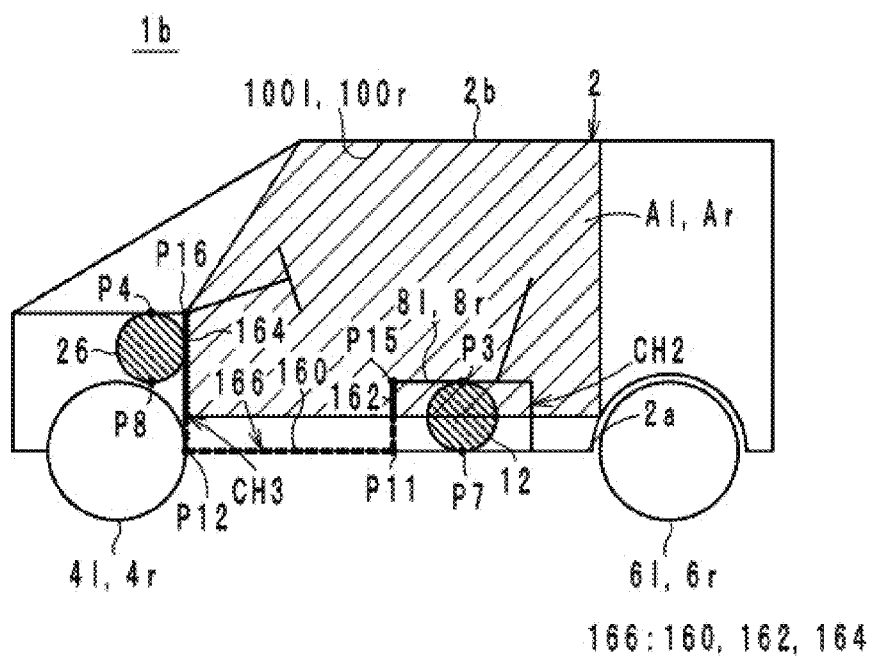
FIG. 9 is a left side view of an open cabin electric wheeled vehicle 1b.

Hereunder, an open cabin electric wheeled vehicle 1b according to a second modification is described while referring to the accompanying drawings. FIG. 9 is a left side view of the open cabin electric wheeled vehicle 1b.

A difference between the open cabin electric wheeled vehicle 1b and the open cabin electric wheeled vehicle 1a is the positional relationship among the recess 166, the left passage region Al and the right passage region Ar. Hereunder, the open cabin electric wheeled vehicle 1b is described, centering on the aforementioned difference.

In the open cabin electric wheeled vehicle 1a, as seen from the leftward direction L or the rightward direction R, the recess 166 fits within the left passage region Al and the right passage region Ar. In contrast, in the open cabin electric wheeled vehicle 1b, as seen from the leftward direction L or the rightward direction R, the recess 166 protrudes in the downward direction D from inside of the left passage region Al and the right passage region Ar. Specifically, as seen from the leftward direction L or the rightward direction R, the bottom portion 160 is located below the left passage region Al and the right passage region Ar in the downward direction D. However, as seen from the leftward direction L or the rightward direction R, one part of the rear wall portion 162 and one part of the front wall portion 164 fits within the left passage region Al and the right passage region Ar. Thus, the phrase "as seen from the leftward direction L or the rightward direction R, the recess 66, 166 overlaps with the left passage region Al and the right passage region Ar" means "a case where, as seen from the leftward direction L or the rightward direction R, all of the recess 66, 166 fits within the left passage region Al and the right passage region Ar" and "a case where, as seen from the leftward direction L or the rightward direction R, one part of the recess 66, 166 fits within the left passage region Al and the right passage region Ar". The remaining configuration of the open cabin electric wheeled vehicle 1b is the same as the configuration of the open cabin electric wheeled vehicle 1a, and hence a description thereof is omitted here. As seen from the perspective of FIG. 9, the right entrance and exit opening portion 100r, right front wheel 4r, right rear wheel 6r, and right front seat 8r are not visible. However, the reference numerals are provided in FIG. 9 to represent these elements being located behind their left-side counterparts, as seen from the side perspective of FIG. 9, while having the same dimensions as their left-side counterparts visible in FIG. 9.

Third Modification

Figure 10:
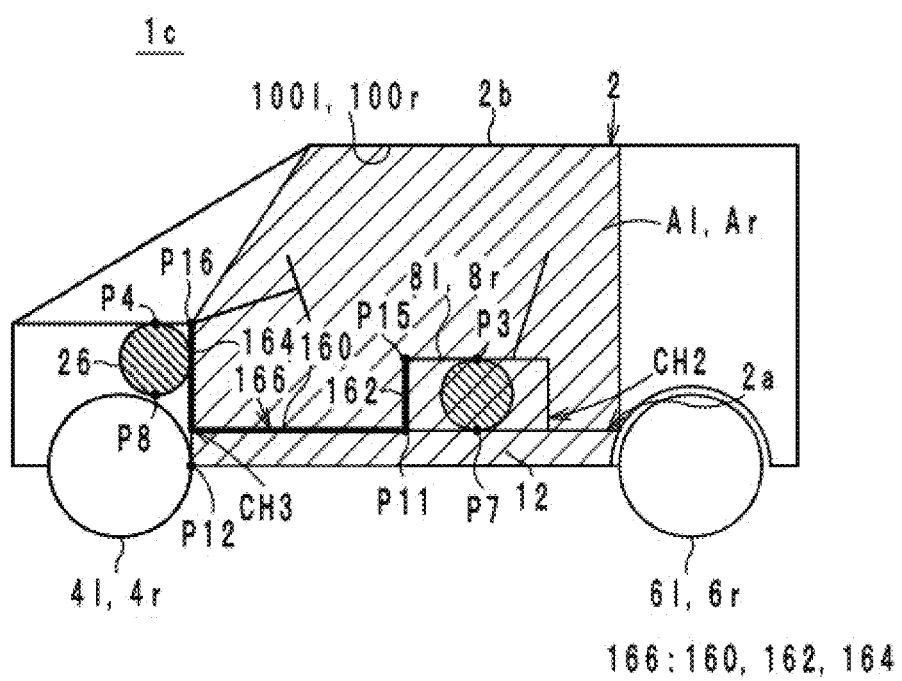
FIG. 10 is a left side view of an open cabin electric wheeled vehicle 1c.

Hereunder, an open cabin electric wheeled vehicle 1c according to a third modification is described while referring to the accompanying drawings. FIG. 10 is a left side view of the open cabin electric wheeled vehicle 1c.

A difference between the open cabin electric wheeled vehicle 1c and the open cabin electric wheeled vehicle 1a is the positional relationship among the recess 166, the left passage region Al and the right passage region Ar. Hereunder, the open cabin electric wheeled vehicle 1c is described, centering on the aforementioned difference.

In the open cabin electric wheeled vehicle 1a, as seen from the leftward direction L or the rightward direction R, the recess 166 fits within the left passage region Al and the right passage region Ar. However, as seen from the leftward direction L or the rightward direction R, the lower side of each of the left entrance and exit opening portion 100l and the right entrance and exit opening portion 100r extends in the front-back direction FB and coincides with the upper surface of the floor 2a. Therefore, as seen from the leftward direction L or the rightward direction R, the lower side of each of the left entrance and exit opening portion 100l and the right entrance and exit opening portion 100r coincides with the upper surface of the bottom portion 60.

In contrast, in the open cabin electric wheeled vehicle 1c, as seen from the leftward direction L or the rightward direction R, the lower side of each of the left entrance and exit opening portion 100l and the right entrance and exit opening portion 100r extends in the front-back direction FB and is located further downward in the downward direction D than the upper surface of the floor 2a. Thus, in the open cabin electric wheeled vehicle 1c, as seen from the leftward direction L or the rightward direction R, all of the recess 166 fits within the right passage region Ar of the right entrance and exit opening portion 100r. The remaining configuration of the open cabin electric wheeled vehicle 1c is the same as the configuration of the open cabin electric wheeled vehicle 1a, and hence a description thereof is omitted here. As seen from the perspective of FIG. 10, the right entrance and exit opening portion 100r, right front wheel 4r, right rear wheel 6r, and right front seat 8r are not visible. However, the reference numerals are provided in FIG. 10 to represent these elements being located behind their left-side counterparts, as seen from the side perspective of FIG. 10, while having the same dimensions as their left-side counterparts visible in FIG. 10.

Fourth Modification

Figure 11:
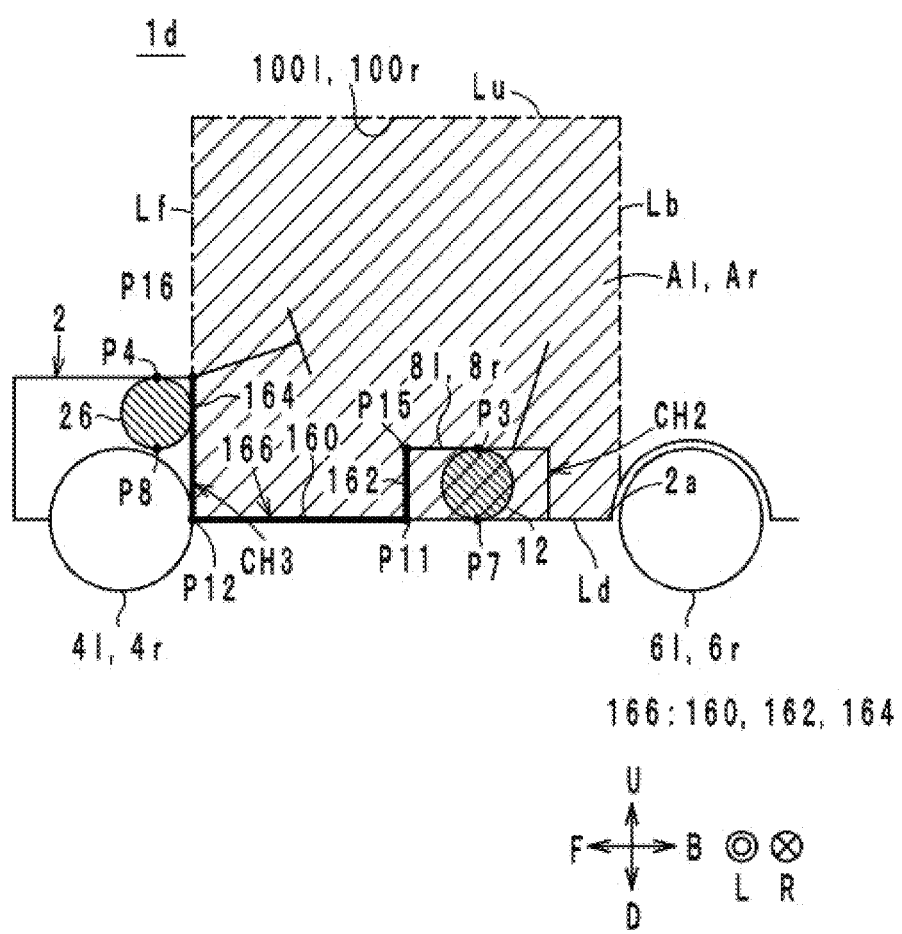
FIG. 11 is a left side view of an open cabin electric wheeled vehicle 1d.

Hereunder, an open cabin electric wheeled vehicle 1d according to a fourth modification is described while referring to the accompanying drawings. FIG. 11 is a left side view of the open cabin electric wheeled vehicle 1d.

A difference between the open cabin electric wheeled vehicle 1d and the open cabin electric wheeled vehicle 1a is that the vehicle body 2 does not include the roof 2b. Hereunder, the open cabin electric wheeled vehicle 1d is described, centering on the aforementioned difference.

In a case where the vehicle body 2 does not include the roof 2b, the left entrance and exit opening portion 100l and the right entrance and exit opening portion 100r are no longer openings. In this case, the left entrance and exit opening portion 100l and the right entrance and exit opening portion 100r are rectangular shapes that, in the left side face of the vehicle body 2, are formed by straight lines Lu, Lf, Ld and Lb. The straight line Ld is a straight line that coincides with the upper surface of the floor 2a as seen from the leftward direction L or the rightward direction R. The straight line Ld extends in the front-back direction FB. The straight line Lu is a straight line that is located 2.0 m above the straight line Ld in the upward direction U as seen from the leftward direction L or the rightward direction R. The straight line Lu extends in the front-back direction FB. The straight line Lf is a straight line that includes the front end of the space (cabin) in which people can ride or baggage can be loaded in the vehicle body 2. The straight line Lf extends in the up-down direction UD. The straight line Lb is a straight line that includes the back end of the space (cabin) in which people can ride or baggage can be loaded in the vehicle body 2. The straight line Lb extends in the up-down direction UD. Further, the left passage region Al and the right passage region Ar are regions that are enclosed by the straight lines Lu, Lf, Ld and Lb as seen from the leftward direction L or the rightward direction R. The remaining configuration of the open cabin electric wheeled vehicle 1d is the same as the configuration of the open cabin electric wheeled vehicle 1a, and hence a description thereof is omitted here.

Fifth Modification

Figure 12:
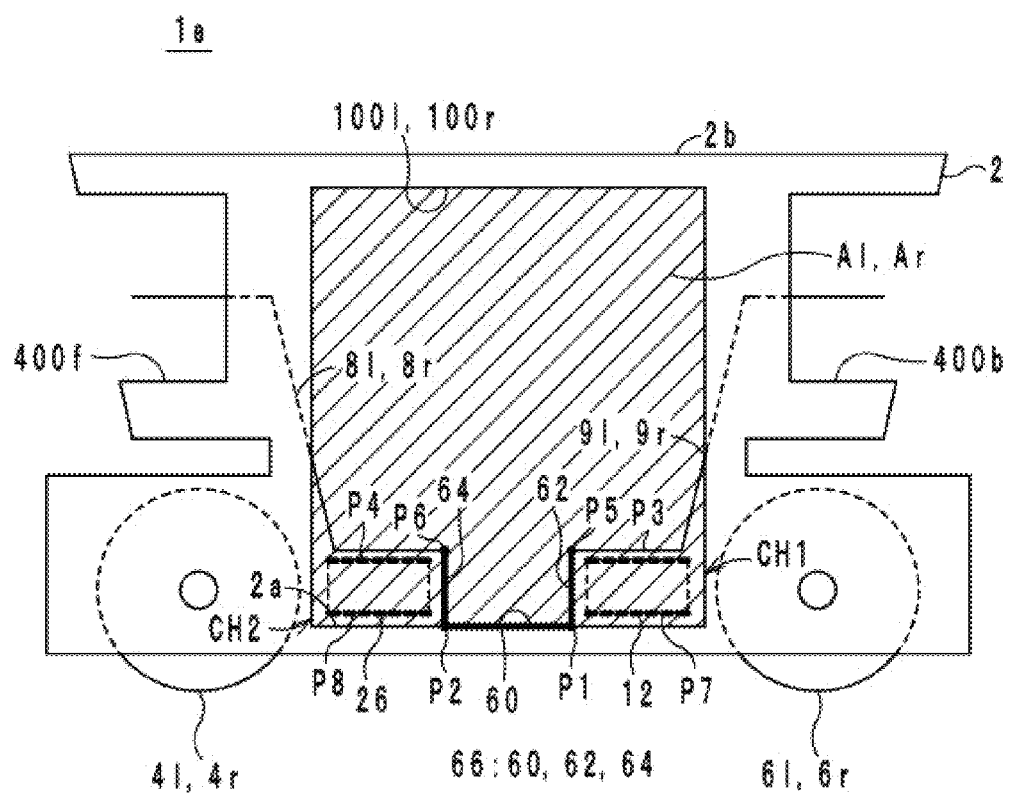
FIG. 12 is a left side view of an open cabin electric wheeled vehicle 1e.

Hereunder, an open cabin electric wheeled vehicle 1e according to a fifth modification is described while referring to the accompanying drawings. FIG. 12 is a left side view of the open cabin electric wheeled vehicle 1e.

The open cabin electric wheeled vehicle 1e is different from the open cabin electric wheeled vehicle 1 in the following points.

(a) The open cabin electric wheeled vehicle 1e is an autonomous vehicle.

(b) The open cabin electric wheeled vehicle 1e is a bi-directional vehicle.

(c) The open cabin electric wheeled vehicle 1e is equipped with communication seats.

The open cabin electric wheeled vehicle 1 is a vehicle that travels based on operations performed by a driver. In contrast, the open cabin electric wheeled vehicle 1e is an autonomous vehicle that can travel without relying on operations performed by a driver. However, the open cabin electric wheeled vehicle 1e may also be capable of travelling based on operations performed by a driver Further, the open cabin electric wheeled vehicle 1e is a bi-directional vehicle. Accordingly, the open cabin electric wheeled vehicle 1e can advance in either of the left direction or the right direction with respect to the paper surface in FIG. 12. However, in the present embodiment, for convenience, the left direction with respect to the paper surface in FIG. 12 is defined as the frontward direction F (that is, the travelling direction of the open cabin electric wheeled vehicle 1e).

Further, the open cabin electric wheeled vehicle 1e includes a left front seat 8l, a right front seat 8r, a left rear seat 9l and a right rear seat 9r. The left front seat 8l, the right front seat 8r, the left rear seat 9l and the right rear seat 9r are communication seats. The communication seats are seats that are constructed so as to allow passengers to sit at positions that allow the passengers to converse with one another while looking at each other's face. The communication seats are seats that are constructed so that a plurality of passengers can sit thereon. The communication seats are, for example, two rows of seats that are arranged so that passengers can face each other. The communication seats may be, for example, seats that are arranged in an L-shape. The communication seats may be, for example, seats that are arranged in an angular C-shape. The communication seats may be, for example, seats that are arranged in a square shape. One passenger may sit in a communication seat or a plurality of passengers may sit in a communication seat. In the communication seats, seated passengers may converse while looking at each other's face or may not converse. The communication seats may be seats that can be changed between a state in which a plurality of passengers that are seated face each other and a state in which a plurality of passengers that are seated face in the same direction. However, the term "communication seats" excludes seats that are fixed in a state in which a plurality of passengers that are seated only face in the same direction.

The left front seat 8l is a seat for a person to sit in. The left front seat 8l is disposed above the left part of the first front chamber CH2 in the upward direction U. A person who is seated in the left front seat 8l directs in the backward direction B. The right front seat 8r is a seat for a person to sit in. The right front seat 8r is disposed above the right part of the first front chamber CH2 in the upward direction U. Thus, as illustrated in FIG. 12, the left front seat 8l and the right front seat 8r are aligned in that order from the leftward direction L to the rightward direction R. A person who is seated in the right front seat 8r directs in the backward direction B.

The left rear seat 9l is a seat for a person to sit in. The left rear seat 9l is disposed above the left part of the rear chamber CH1 in the upward direction U. Accordingly, the left rear seat 9l is disposed behind the left front seat 8l in the backward direction B. A person who is seated in the left rear seat 9l directs in the frontward direction F. The right rear seat 9r is a seat for a person to sit in. The right rear seat 9r is disposed above the right part of the rear chamber CH1 in the upward direction U. Accordingly, the right rear seat 9r is disposed behind the right front seat 8r in the backward direction B. Thus, the left rear seat 9l and the right rear seat 9r are aligned in that order from the leftward direction L to the rightward direction R. A person who is seated in the right rear seat 9r directs in the frontward direction F. The remaining configuration of the open cabin electric wheeled vehicle 1e is the same as the configuration of the open cabin electric wheeled vehicle 1, and hence a description thereof is omitted here. As seen from the perspective of FIG. 12, the right entrance and exit opening portion 100r, right front wheel 4r, right rear wheel 6r, right front seat 8r, and right rear seat 9r are not visible. However, the reference numerals are provided in FIG. 12 to represent these elements being located behind their left-side counterparts, as seen from the side perspective of FIG. 12, while having the same dimensions as their left-side counterparts visible in FIG. 12.

Sixth Modification

Figure 13:
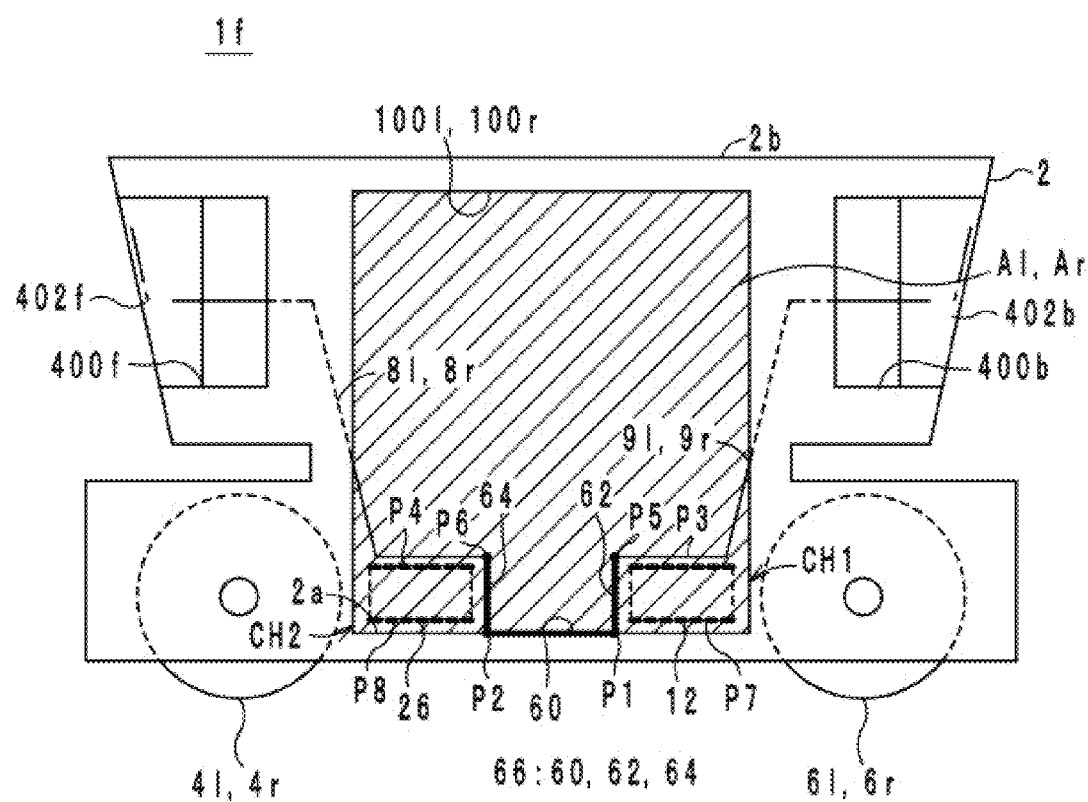
FIG. 13 is a left side view of an open cabin electric wheeled vehicle 1f.

Hereunder, an open cabin electric wheeled vehicle 1*f* according to a sixth modification is described while referring to the accompanying drawings. FIG. 13 is a left side view of the open cabin electric wheeled vehicle 1*f*.

A difference between the open cabin electric wheeled vehicle 1*f* and the open cabin electric wheeled vehicle 1*e* is that window glass 402*f* and 402*b* is provided in windows 400*f* and 400*b*. Hereunder, the open cabin electric wheeled vehicle 1*f* is described, centering on the aforementioned difference.

A window 400*f* is provided at a front part of the vehicle body 2 of the open cabin electric wheeled vehicle 1*e*. A window 400*b* is provided at a rear part of the vehicle body 2 of the open cabin electric wheeled vehicle 1*e*. However, in the open cabin electric wheeled vehicle 1*e*, window glass is not provided in the windows 400*f* and 400*b*.

In contrast, in the open cabin electric wheeled vehicle 1*f*, window glass 402*f* that closes off a part of the window 400*f* is provided. Further, in the open cabin electric wheeled vehicle 1*f*, window glass 402*b* that closes off a part of the window 400*b* is provided. Note that, the window glass 402*f* may close off the entire window 400*f*. The window glass 402*b* may close off the entire window 400*b*. The remaining configuration of the open cabin electric wheeled vehicle 1*f* is the same as the configuration of the open cabin electric wheeled vehicle 1*e*, and hence a description thereof is omitted here.

(Modification of Positional Relationship Among Recess, Fuel-Type Electric Power Generation Apparatus and Large-Capacity Driving Battery)

Hereunder, modifications of the positional relationship among the recess 66, the fuel-type electric power generation apparatus 12 and the large-capacity driving battery 26 are described while referring to the accompanying drawings. FIG. 14 and FIG. 15 are left side views of the recess 66, the fuel-type electric power generation apparatus 12 and the large-capacity driving battery 26. FIG. 14 illustrates the positional relationship according to a first modification. FIG. 15 illustrates the positional relationship according to a second modification.

As illustrated in FIG. 14, the bottom end P8 of the large-capacity driving battery 26 and the bottom end P7 of the fuel-type electric power generation apparatus 12 may be located at the same height as the bottom end P1 of the rear wall portion 62, the bottom end P2 of the front wall portion 64, and the bottom portion 60. Further, in a case where the heights of the bottom end P1 of the rear wall portion 62, the bottom end P2 of the front wall portion 64, and the bottom portion 60 are different from each other, the bottom end P8 of the large-capacity driving battery 26 may be located at the same height as the bottom end P2 of the front wall portion 64, and the bottom end P7 of the fuel-type electric power generation apparatus 12 may be located at the same height as the bottom end P1 of the rear wall portion 62.

Further, as illustrated in FIG. 15, the bottom end P8 of the large-capacity driving battery 26 and the bottom end P7 of the fuel-type electric power generation apparatus 12 may be located further downward in the downward direction D than the bottom end P1 of the rear wall portion 62, the bottom end P2 of the front wall portion 64, and the bottom portion 60. In addition, in a case where the heights of the bottom end P1 of the rear wall portion 62, the bottom end P2 of the front wall portion 64, and the bottom portion 60 are different from each other, the bottom end P8 of the large-capacity driving battery 26 may be located further downward in the downward direction D than the bottom end P2 of the front wall portion 64, and the bottom end P7 of the fuel-type electric power generation apparatus 12 may be located further downward in the downward direction D than the bottom end P1 of the rear wall portion 62.

Note that, although not illustrated in the drawings, the bottom end P8 of the large-capacity driving battery 26 may be located further downward in the downward direction D than the bottom end P1 of the rear wall portion 62, the bottom end P2 of the front wall portion 64, and the bottom portion 60, and the bottom end P7 of the fuel-type electric power generation apparatus 12 may be located further upward in the upward direction U than the bottom end P1 of the rear wall portion 62, the bottom end P2 of the front wall portion 64, and the bottom portion 60. In addition, in a case where the heights of the bottom end P1 of the rear wall portion 62, the bottom end P2 of the front wall portion 64, and the bottom portion 60 are different from each other, the bottom end P8 of the large-capacity driving battery 26 may be located further downward in the downward direction D than the bottom end P2 of the front wall portion 64, and the bottom end P7 of the fuel-type electric power generation apparatus 12 may be located further upward in the upward direction U than the bottom end P1 of the rear wall portion 62.

Note that, although not illustrated in the drawings, the bottom end P8 of the large-capacity driving battery 26 may be located further upward in the upward direction U than the bottom end P1 of the rear wall portion 62, the bottom end P2 of the front wall portion 64, and the bottom portion 60, and the bottom end P7 of the fuel-type electric power generation apparatus 12 may be located further downward in the downward direction D than the bottom end P1 of the rear wall portion 62, the bottom end P2 of the front wall portion 64, and the bottom portion 60. Further, in a case where the heights of the bottom end P1 of the rear wall portion 62, the bottom end P2 of the front wall portion 64, and the bottom portion 60 are different from each other, the bottom end P8 of the large-capacity driving battery 26 may be located further upward in the upward direction U than the bottom end P2 of the front wall portion 64, and the bottom end P7 of the fuel-type electric power generation apparatus 12 may be located further downward in the downward direction D than the bottom end P1 of the rear wall portion 62.

Note that, although not illustrated in the drawings, the bottom end P8 of the large-capacity driving battery 26 may be located at the same height as the bottom end P1 of the rear wall portion 62, the bottom end P2 of the front wall portion 64, and the bottom portion 60, and the bottom end P7 of the fuel-type electric power generation apparatus 12 may be located further upward in the upward direction U or further downward in the downward direction D than the bottom end P1 of the rear wall portion 62, the bottom end P2 of the front wall portion 64, and the bottom portion 60. In addition, in a case where the heights of the bottom end P1 of the rear wall portion 62, the bottom end P2 of the front wall portion 64, and the bottom portion 60 are different from each other, the bottom end P8 of the large-capacity driving battery 26 may be located at the same height as the bottom end P2 of the front wall portion 64, and the bottom end P7 of the fuel-type electric power generation apparatus 12 may be located further upward in the upward direction U or further downward in the downward direction D than the bottom end P1 of the rear wall portion 62.

Note that, although not illustrated in the drawings, the bottom end P8 of the large-capacity driving battery 26 may be located further upward in the upward direction U or further downward in the downward direction D than the bottom end P1 of the rear wall portion 62, the bottom end P2 of the front wall portion 64, and the bottom portion 60, and the bottom end P7 of the fuel-type electric power generation apparatus 12 may be located at the same height as the bottom end P1 of the rear wall portion 62, the bottom end P2 of the front wall portion 64, and the bottom portion 60. Further, in a case where the heights of the bottom end P1 of the rear wall portion 62, the bottom end P2 of the front wall portion 64, and the bottom portion 60 are different from each other, the bottom end P8 of the large-capacity driving battery 26 may be located further upward in the upward direction U or further downward in the downward direction D than the bottom end P2 of the front wall portion 64, and the bottom end P7 of the fuel-type electric power generation apparatus 12 may be located at the same height as the bottom end P1 of the rear wall portion 62.

Note that, although not illustrated in the drawings, the top end P4 of the large-capacity driving battery 26 and the top end P3 of the fuel-type electric power generation apparatus 12 may be located at the same height as the top end P5 of the rear wall portion 62 and the top end P6 of the front wall portion 64. Further, in a case where the heights of the top end P5 of the rear wall portion 62 and the top end P6 of the front wall portion 64 are different from each other, the top end P4 of the large-capacity driving battery 26 may be located at the same height as the top end P6 of the front wall portion 64, and the top end P3 of the fuel-type electric power generation apparatus 12 may be located at the same height as the top end P5 of the rear wall portion 62.

Note that, although not illustrated in the drawings, the top end P4 of the large-capacity driving battery 26 may be located at the same height as the top end P5 of the rear wall portion 62 and the top end P6 of the front wall portion 64, and the top end P3 of the fuel-type electric power generation apparatus 12 may be located further upward in the upward direction U or further downward in the downward direction D than the top end P5 of the rear wall portion 62 and the top end P6 of the front wall portion 64. Further, in a case where the heights of the top end P5 of the rear wall portion 62 and the top end P6 of the front wall portion 64 are different from each other, the top end P4 of the large-capacity driving battery 26 may be located at the same height as the top end P6 of the front wall portion 64, and the top end P3 of the fuel-type electric power generation apparatus 12 may be located further upward in the upward direction U or further downward in the downward direction D than the top end P5 of the rear wall portion 62.

Note that, although not illustrated in the drawings, the top end P4 of the large-capacity driving battery 26 may be located further upward in the upward direction U or further downward in the downward direction D than the top end P5 of the rear wall portion 62 and the top end P6 of the front wall portion 64, and the top end P3 of the fuel-type electric power generation apparatus 12 may be located at the same height as the top end P5 of the rear wall portion 62 and the top end P6 of the front wall portion 64. Further, in a case where the heights of the top end P5 of the rear wall portion 62 and the top end P6 of the front wall portion 64 are different from each other, the top end P4 of the large-capacity driving battery 26 may be located further upward in the upward direction U or further downward in the downward direction D than the top end P6 of the front wall portion 64, and the top end P3 of the fuel-type electric power generation apparatus 12 may be located at the same height as the top end P5 of the rear wall portion 62.

Note that, although not illustrated in the drawings, the top end P4 of the large-capacity driving battery 26 may be located further upward in the upward direction U than the top end P5 of the rear wall portion 62 and the top end P6 of the front wall portion 64, and the top end P3 of the fuel-type electric power generation apparatus 12 may be located further downward in the downward direction D than the top end P5 of the rear wall portion 62 and the top end P6 of the front wall portion 64. Further, in a case where the heights of the top end P5 of the rear wall portion 62 and the top end P6 of the front wall portion 64 are different from each other, the top end P4 of the large-capacity driving battery 26 may be located further upward in the upward direction U than the top end P6 of the front wall portion 64, and the top end P3 of the fuel-type electric power generation apparatus 12 may be located further downward in the downward direction D than the top end P5 of the rear wall portion 62.

Note that, although not illustrated in the drawings, the top end P4 of the large-capacity driving battery 26 may be located further downward in the downward direction D than the top end P5 of the rear wall portion 62 and the top end P6 of the front wall portion 64, and the top end P3 of the fuel-type electric power generation apparatus 12 may be located further upward in the upward direction U than the top end P5 of the rear wall portion 62 and the top end P6 of the front wall portion 64. Further, in a case where the heights of the top end P5 of the rear wall portion 62 and the top end P6 of the front wall portion 64 are different from each other, although not illustrated in the drawings, the top end P4 of the large-capacity driving battery 26 may be located further downward in the downward direction D than the top end P6 of the front wall portion 64, and the top end P3 of the fuel-type electric power generation apparatus 12 may be located further upward in the upward direction U than the top end P5 of the rear wall portion 62.

(Regarding Definition of Bottom Portion, Front Wall Portion and Rear Wall Portion)

Figure 16:
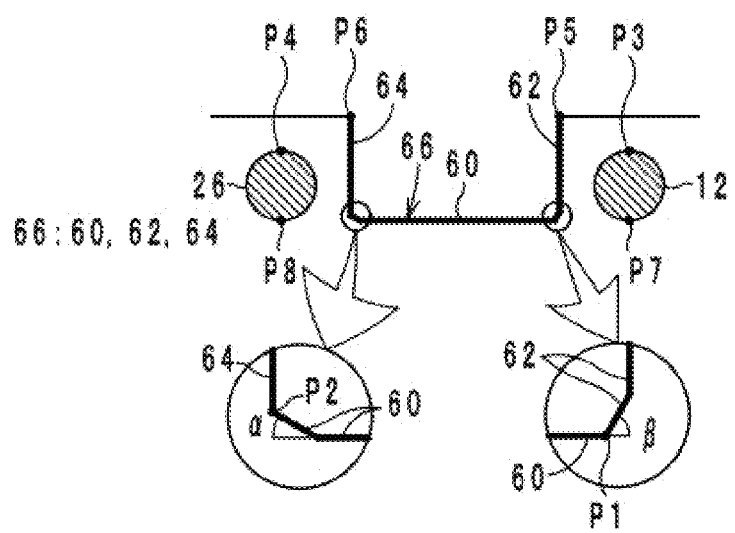
FIG. 16 is a left side view of the recess 66, the fuel-type electric power generation apparatus 12 and the large-capacity driving battery 26.

Next, the definition of the bottom portion 60, the rear wall portion 62 and the front wall portion 64 will be described while referring to the accompanying drawings. FIG. 16 is a left side view of the recess 66, the fuel-type electric power generation apparatus 12 and the large-capacity driving battery 26.

The bottom portion 60 is a portion that, as seen from the leftward direction L or the rightward direction R, includes a face at which an angle formed with the horizontal plane is less than 45° in the recess 66. Therefore, the bottom portion 60 is not limited to a plate-like member having an upper surface that is parallel with the horizontal plane. Further, the rear wall portion 62 is a portion that includes a face at which an angle formed with the horizontal plane is 45° or more in the recess 66. Therefore, the rear wall portion 62 is not limited to a plate-like member having a front face that is perpendicular to the horizontal plane. The front wall portion 64 is a portion that includes a face at which an angle formed with the horizontal plane is 45° or more in the recess 66. Therefore, the front wall portion 64 is not limited to a plate-like member having a rear face that is perpendicular to the horizontal plane.

The above definitions will now be described in more detail while referring to FIG. 16. An inclined portion exists between the bottom portion 60 and the front wall portion 64. An angle $\alpha$ formed between the upper surface of the inclined portion and the horizontal plane is less than 45°. Accordingly, the inclined portion is a part of the bottom portion 60. Further, an inclined portion exists between the bottom portion 60 and the rear wall portion 62. An angle $\beta$ formed between the front face of the inclined portion and the horizontal plane is greater than 45°. Accordingly, the inclined portion is a part of the rear wall portion 62.

Other Embodiments

The embodiment and modifications described and/or illustrated in this specification are described in order to facilitate understanding of the present disclosure, and are not intended to limit the concept of the present disclosure. The above described embodiment and modifications may be changed or modified without departing from the gist thereof.

The gist includes equivalent elements, corrections, deletions, combinations (for example, combinations of features spanning over embodiment and modifications), improvements, and alterations that can be recognized by those skilled in the art based on the embodiment disclosed in the present specification. The limitations of the appended claims should be broadly interpreted based on the terms used in the appended claims, and the limitations should not be limited by the embodiment and modifications described in the present description or in the prosecution of the present application. The embodiment and modifications should be construed as non-exclusive. For example, the terms "preferably" and "may" are non-exclusive in the present specification, meaning "preferable, but not limited to this" and "may be, but not limited to this."

Note that the fuel-type electric power generation apparatus is not limited to a fuel cell stack. It suffices that the fuel-type electric power generation apparatus is an apparatus that generates electric power using a fuel. Therefore, the fuel-type electric power generation apparatus may be an apparatus that generates electric power using a fossil fuel (gasoline, light oil or the like) or using alcohol (methanol or the like). In this case, the fuel-type electric power generation apparatus is an engine.

The large-capacity driving battery need not be a secondary battery, and may be a primary battery.

The open cabin electric wheeled vehicle need not include seats. In this case, baggage is loaded in the open cabin electric wheeled vehicle, and people do not ride therein. The baggage may be loaded on the bottom portion, or may be loaded on the first front chamber or on the rear chamber Note that, it suffices that the front wall portion extends upward from the bottom portion. Therefore, the front face of the front wall portion need not be perpendicular to the horizontal plane. It suffices that the rear wall portion extends upward from the bottom portion. Therefore, the rear face of the rear wall portion need not be perpendicular to the horizontal plane.

Note that, the large-capacity driving battery is disposed in front of the recess, and the fuel-type electric power generation apparatus is disposed behind the recess. However, the large-capacity driving battery may be disposed behind the recess, and the fuel-type electric power generation apparatus may be disposed in front of the recess.

Note that, the floor has been described as being a flat surface. However, the floor may have slight unevenness. The height of the slight unevenness is sufficiently less than the depth of the recess. For example, the height of the slight unevenness is not more than ⅕ of the depth of the recess. The slight unevenness is, for example, ribs that are formed for enhancing the strength of the floor.

Note that, the controller may change the dilution capacity of the dilution device according to an amount of power generation of the fuel-type electric power generation apparatus. More specifically, the dilution device includes a fan for sending air into the dilution device. The controller estimates an amount of hydrogen to be discharged from the fuel-type electric power generation apparatus, based on the amount of power generation of the fuel-type electric power generation apparatus. The controller controls the rotational speed of the fan of the dilution device based on the estimated amount of hydrogen. In a case where the estimated amount of hydrogen is relatively small, the controller controls the fan of the dilution device so that the rotational speed of the fan becomes relatively low. In a case where the estimated amount of hydrogen is relatively large, the controller controls the fan of the dilution device so that the rotational speed of the fan becomes relatively high.

Note that the dilution device need not include a fan. In this case, the radiator fan also serves as a fan of the dilution device. The controller controls the rotational speed of the radiator fan based on the temperature of the cooling water and the amount of power generation of the fuel-type electric power generation apparatus. For example, in a case of cooling the cooling water of the radiator, the controller controls the rotational speed of the radiator fan based on the temperature of the cooling water. For example, in a case of diluting hydrogen, the controller controls the rotational speed of the radiator fan based on the amount of power generation of the fuel-type electric power generation apparatus.

Note that, electric power converted by the fuel-type electric power generation apparatus is stored in the large-capacity driving battery. However, a part or all of the electric power converted by the fuel-type electric power generation apparatus may be supplied directly to the driving electric motor, without being stored in the large-capacity driving battery.

Note that, the open cabin electric wheeled vehicle may have a configuration that enables charging of the large-capacity driving battery with electric power from a plug. In this case, the open cabin electric wheeled vehicle is equipped with a battery charger.

Note that, entrance and exit opening portions are provided in the left side face and the right side face of the vehicle body. However, an entrance and exit opening portion may be provided in only the left side face or the right side face of the vehicle body.

The open cabin electric wheeled vehicle is equipped with two driving wheels. However, it suffices that the open cabin electric wheeled vehicle is equipped with one or more driving wheels.

REFERENCE SIGNS LIST

1, 1a to 1f: Open cabin electric wheeled vehicle
2: Vehicle body
2a: Floor
2b: Roof
4l: Left front wheel
4r: Right front wheel
6l: Left rear wheel
6r: Right rear wheel
8l: Left front seat
8r: Right front seat
9l: Left rear seat
9r: Right rear seat
10: Controller
12: Fuel-type electric power generation apparatus
14: Air blower
16: Hydrogen tank
18: Solenoid valve 20: Hydrogen pressure sensor
22: Thermistor
24: DC/DC convertor
26: Large-capacity driving battery
28: Inverter
30: Driving electric motor
31: Lead storage battery
32: Radiator
34: Cooling pump
36: Radiator fan
38: Dilution device
40: Indicator
42: Hydrogen leakage detector
60, 160: Bottom portion
62, 162: Rear wall portion
64, 164: Front wall portion
66, 166: Recess
100*l*: Left entrance and exit opening portion
100*r*: Right entrance and exit opening portion
200: Motive power system
Al: Left passage region
Ar: Right passage region
CH1: Rear chamber
CH2: First front chamber
CH3: Second front chamber

What is claimed is:

1. An open cabin electric wheeled vehicle, comprising:
a vehicle body forming a cabin for accommodating people or baggage, the vehicle body including an entrance and exit opening portion and a recess, the entrance and exit opening portion being provided in one or both of a left side face and a right side face of the vehicle body and having a passage region which allows the people or the baggage to pass into and out from the vehicle body, the entrance and exit opening portion having no door, the vehicle body having a floor, the recess having
a bottom portion that is a part of the floor and that extends in a left-right direction,
a front wall portion extending upward from a front end of the bottom portion, and
a rear wall portion extending upward from a back end of the bottom portion;
one or more driving wheels rotatably fixed to the vehicle body; and
a driving electric motor that generates a driving force for rotating the one or more driving wheels,
the open cabin electric wheeled vehicle further comprising:
a large-capacity driving battery that is fixed to an upper surface of the floor and having a volume energy density higher than a volume energy density of a lead storage battery, the large-capacity driving battery being configured to supply electric power to the driving electric motor; and
a fuel-type electric power generation apparatus that is fixed to the upper surface of the floor and generates electric power using a fuel, wherein:
as seen from a leftward direction or a rightward direction, between the large-capacity driving battery and the fuel-type electric power generation apparatus, the recess overlaps with the passage region, so that a bottom end of the front wall portion, a bottom end of the rear wall portion, and the bottom portion are located further downward than a top end of the large-capacity driving battery and a top end of the fuel-type electric power generation apparatus, and
the recess is located in front of the one or more driving wheels, the driving electric motor and the fuel-type electric power generation apparatus, and is behind the large-capacity driving battery.

2. The open cabin electric wheeled vehicle according to claim 1, wherein:
the large-capacity driving battery stores electric power converted by the fuel-type electric power generation apparatus.

3. The open cabin electric wheeled vehicle according to claim 1, wherein:
neither a bottom end of the large-capacity driving battery nor a bottom end of the fuel-type electric power generation apparatus is located farther downward, in a height direction, than any of the bottom end of the front wall portion, the bottom end of the rear wall portion, and the bottom portion of the recess.

4. The open cabin electric wheeled vehicle according to claim 1, wherein:
the vehicle body includes a first chamber that includes the rear wall portion, and a second chamber that includes the front wall portion;
the first chamber houses the fuel-type electric power generation apparatus; and
the second chamber houses the large-capacity driving battery.

5. The open cabin electric wheeled vehicle according to claim 4, further comprising:
a front seat and a rear seat configured for the people to sit on;
wherein:
the front seat is disposed above the second chamber, and
the rear seat is disposed above the first chamber.

6. The open cabin electric wheeled vehicle according to claim 1, wherein:
the large-capacity driving battery is a lithium-ion secondary battery, a nickel-cadmium storage battery, a nickel-hydride storage battery or an all-solid-state battery.

7. The open cabin electric wheeled vehicle according to claim 1, wherein:
the fuel-type electric power generation apparatus is a fuel cell stack that generates electric power using hydrogen.

8. The open cabin electric wheeled vehicle according to claim 1, wherein:
the bottom portion of the recess is configured to accommodate feet of the people or the baggage.

9. An open cabin electric wheeled vehicle, comprising:
a vehicle body forming a cabin for accommodating people or baggage, the vehicle body including an entrance and exit opening portion and a recess, the entrance and exit opening portion being provided in one or both of a left side face and a right side face of the vehicle body and having a passage region which allows the people or the baggage to pass into and out from the vehicle body, the entrance and exit opening portion having no door, the recess having a bottom portion, a front wall portion and a rear wall portion, the bottom portion extending in a left-right direction, the front wall portion extending upward from a front end of the bottom portion, the rear wall portion extending upward from a back end of the bottom portion;
one or more driving wheels rotatably fixed to the vehicle body; and
a driving electric motor that generates a driving force for rotating the one or more driving wheels, the open cabin electric wheeled vehicle further comprising:
- a large-capacity driving battery having a volume energy density higher than a volume energy density of a lead storage battery, the large-capacity driving battery being configured to supply electric power to the driving electric motor; and
- a fuel-type electric power generation apparatus that generates electric power using a fuel, wherein:

as seen from a leftward direction or a rightward direction, between the large-capacity driving battery and the fuel-type electric power generation apparatus, the recess overlaps with the passage region, so that a bottom end of the front wall portion, a bottom end of the rear wall portion, and the bottom portion are located further downward than a top end of the large-capacity driving battery and a top end of the fuel-type electric power generation apparatus, and neither a bottom end of the large-capacity driving battery nor a bottom end of the fuel-type electric power generation apparatus is located farther downward, in a height direction, than any of the bottom end of the front wall portion, the bottom end of the rear wall portion, and the bottom portion of the recess.

* * * * *